US010067655B2

(12) United States Patent
Hamilton et al.

(10) Patent No.: US 10,067,655 B2
(45) Date of Patent: Sep. 4, 2018

(54) VISUAL AND QUANTITATIVE FACTORS ANNALYSIS SYSTEMS FOR RELATING A HIERARCHY OF FACTORS INCLUDING ONE OR MORE RESOURCES, TASKS, AND COGNITIVE MODELS DISPLAYED IN A HIERARCHICAL GRAPHICAL INTERFACE ENABLING VISUAL AND QUANTITATIVE EVALUATION OF SUFFICIENCY OF SUCH FACTORS IN RELATION TO ONE OR MORE PROBLEM/SOLUTION SETS

(71) Applicant: The United States of America as represented by the Secretary of the Navy, Washington, DC (US)

(72) Inventors: John Hamilton, Solsberry, IN (US);
Gail Nicholson, Bloomington, IN (US);
Gary Bullock, Bedford, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 364 days.

(21) Appl. No.: 14/230,486

(22) Filed: Mar. 31, 2014

(65) Prior Publication Data
US 2015/0121272 A1 Apr. 30, 2015

Related U.S. Application Data

(60) Provisional application No. 61/817,918, filed on May 1, 2013.

(51) Int. Cl.
*G06F 3/048* (2013.01)
*G06F 17/00* (2006.01)
(Continued)

(52) U.S. Cl.
CPC .......... *G06F 3/04842* (2013.01); *G06F 3/048* (2013.01); *G06F 3/0482* (2013.01);
(Continued)

(58) Field of Classification Search
CPC .... G06F 3/0484; G06F 3/04842; G06F 3/048; G06F 17/00; G06F 8/00; G06Q 10/00
(Continued)

(56) References Cited

U.S. PATENT DOCUMENTS 6,778,971 B1 * 8/2004 Altschuler ............. G06Q 10/06
700/29
8,175,987 B2 * 5/2012 Fickie ..................... G06N 3/12
706/13
(Continued)

OTHER PUBLICATIONS

Centers of Gravity from the "Inside Out", by Jan L. Rueschhoff and Jonathan P. Dunne, JFQ/Issue 60, 1st quarter 2011, ndupress.ndu. edu (120-125), 6 pages.

*Primary Examiner* — Hugo Molina
(74) *Attorney, Agent, or Firm* — Christopher A. Monsey

(57) ABSTRACT

A collection of machine readable instructions stored in a storage medium and process for graphical modeling including defining a plurality of resources comprising a plurality of resource objects and associating attributes with said task objects; defining a plurality of tasks comprising a plurality of task objects, said task objects comprise elements, with a plurality of hierarchical elements and sub-elements, and associating attributes with said elements and sub-elements; selecting at least one cognitive model defining a human cognitive process or model; determining if at least one relationship between said plurality of task objects, resource objects, and at least one cognitive model exists; graphically associating said at least one relationship with said task object, resource, object, and at least one cognitive model element where said relationship is determined; defining
(Continued)

attributes associated with each said graphical relationship; and generating a graphical dashboard or data output associated with said task objects, resource objects, and said cognitive model based in part on said graphical relationships.

9 Claims, 15 Drawing Sheets

(51) Int. Cl.
    *G06Q 40/00*     (2012.01)
    *G06F 15/18*     (2006.01)
    *G06F 3/0484*     (2013.01)
    *G06F 3/0482*     (2013.01)
    *G06F 8/34*     (2018.01)
    *G06Q 10/06*     (2012.01)
    *G06F 8/10*     (2018.01)

(52) U.S. Cl.
    CPC .................. *G06F 8/10* (2013.01); *G06F 8/34* (2013.01); *G06Q 10/06* (2013.01)

(58) Field of Classification Search
    USPC .......................................... 715/771; 717/105
    See application file for complete search history.

(56) References Cited

U.S. PATENT DOCUMENTS

| | | | | |
|---|---|---|---|---|
| 8,886,587 | B1* | 11/2014 | Hainsworth | G06N 5/025 706/46 |
| 2003/0008270 | A1* | 1/2003 | Fleishman | G06Q 30/0241 434/322 |
| 2003/0177168 | A1* | 9/2003 | Heitman | H04L 67/1097 709/201 |
| 2004/0015465 | A1* | 1/2004 | Gill | G06Q 10/06 706/50 |
| 2005/0038780 | A1* | 2/2005 | de Souza | G06Q 10/00 |
| 2005/0198026 | A1* | 9/2005 | Dehlinger | G06F 17/277 |
| 2006/0003298 | A1* | 1/2006 | Greenshpan | A63B 24/0003 434/247 |
| 2006/0254601 | A1* | 11/2006 | Matsumura | G06Q 10/06 128/898 |
| 2007/0247979 | A1* | 10/2007 | Brillon | G06Q 30/0603 369/30.06 |
| 2008/0114708 | A1* | 5/2008 | Stone | G06N 99/005 706/12 |
| 2009/0094184 | A1* | 4/2009 | Ross | G06F 17/30734 706/60 |
| 2009/0122575 | A1* | 5/2009 | Omura | G02B 6/0038 362/608 |
| 2010/0094899 | A1* | 4/2010 | Yiu | G06F 9/5044 707/770 |
| 2010/0205021 | A1* | 8/2010 | Jewett | G06Q 10/06 705/7.23 |
| 2011/0055699 | A1* | 3/2011 | Li | G06F 17/30864 715/709 |
| 2011/0078652 | A1* | 3/2011 | Mani | G06F 8/10 717/105 |
| 2011/0087515 | A1* | 4/2011 | Miller | G06Q 10/04 705/7.26 |
| 2011/0231352 | A1* | 9/2011 | Reynolds | G06N 7/00 706/45 |
| 2011/0246961 | A1* | 10/2011 | Tripathi | G06F 8/34 717/105 |
| 2012/0123579 | A1* | 5/2012 | Kubli | B21D 22/20 700/104 |
| 2012/0144309 | A1* | 6/2012 | Zendler | G06F 3/04815 715/739 |
| 2013/0086460 | A1* | 4/2013 | Folting | G06Q 10/10 715/212 |
| 2013/0262279 | A1* | 10/2013 | Finley | G06Q 40/10 705/31 |
| 2014/0004548 | A1* | 1/2014 | Gordon | B01L 3/5029 435/21 |
| 2014/0189636 | A1* | 7/2014 | Jalaldeen | G06F 8/10 717/104 |

* cited by examiner

VISUAL AND QUANTITATIVE FACTORS ANNALYSIS SYSTEMS FOR RELATING A HIERARCHY OF FACTORS INCLUDING ONE OR MORE RESOURCES, TASKS, AND COGNITIVE MODELS DISPLAYED IN A HIERARCHICAL GRAPHICAL INTERFACE ENABLING VISUAL AND QUANTITATIVE EVALUATION OF SUFFICIENCY OF SUCH FACTORS IN RELATION TO ONE OR MORE PROBLEM/SOLUTION SETS

CROSS-REFERENCE TO RELATED APPLICATIONS

The present application claims priority to U.S. Provisional Patent Application Ser. No. 61/817,918, filed May 1, 2013, entitled "PROCESS AND SYSTEM FOR GRAPHICAL RESOURCING DESIGN, ALLOCATION, AND/OR EXECUTION MODELING AND VALIDATION," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 102,556) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to human-machine interfaces adapted enable graphical and intuitive analysis for complex multi-variable resourcing or systems-of-systems design modeling and/or validation. One embodiment of the invention enables graphical resource modeling and/or validation based on resources, task mapping, and cognitive model correlations. Another embodiment can include a system and process for mapping capabilities or derive requirements for a problem using a given set of resources and a cognitive model.

Existing systems or processes for requirements analysis do not provide a graphically intuitive human-machine interface. Existing requirement analysis systems are not exploiting visual knowledge that leverage current interactive graphical human/machine interfaces. Human-Computer Symbiosis includes an idea that technology should be designed in a way that amplifies human intelligence instead of attempting to replace it or automating a manual process. Thus, an aim of the invention is to create an improved graphical interface for enabling or amplifying human analytics work and analysis that lets people interact with a virtualization or visualization of their business problem within a graphical context which provides an intuitive and immediate set of relationships which aid in making decisions in the context of multi-variable problems by emphasizing graphical correlations that can be assigned meaning and stored in a computer system data base, permit rapid collective assessments within a system-of-systems context, and correlate resourcing, human problems/interactions, and cognitive models.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
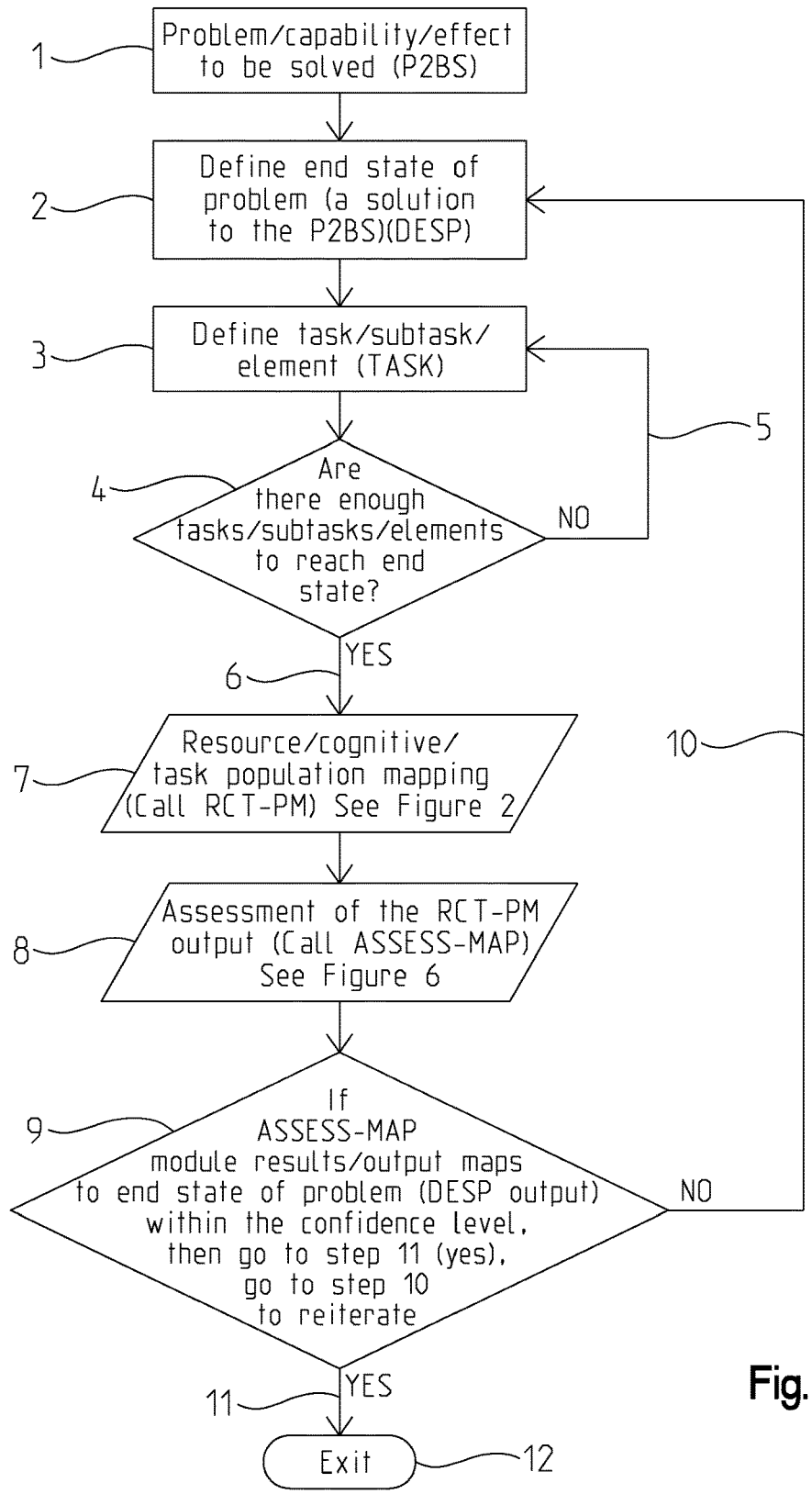
FIG. 1 shows an exemplary overall process associated with an exemplary Task Map Analysis Process (TMAP)

Referring initially to FIG. 1, a segment of a machine implemented process is shown which can be implemented using a graphical user interface (GUI). A GUI is provided to permit a user to select a problem to be solved (P2BS); an exemplary GUI can enable this selection from a drop down menu of known problems/capability/effects with or without the option to add a P2BS.

At Step 2, a GUI will prompt a user to define a satisfactory solution/end state is; this satisfactory solution/end state can be in absolute terms, relative terms/criteria or varying degrees of abstraction, dollars, confidence factors, e.g. exit criteria: a Step 2 definition is used in, e.g., Step 9, to determine if an adequate solution to the tasks or problems is to be had by an exact match or a relative match such as by use of fuzzy logic, subjective voting by a user, Monte Carlo betting by one or more users or evaluators, etc.

At Step 3, a user will define a task/subtask/element in a GUI that a particular stakeholder or stakeholder class is solving (that contributes to the end state solution). The Step 3 task/subtask/element is added to a list. The solution can have many separate tasks that may need to be solved to reach a satisfactory end state. Note if a satisfactory solution is not reached at a later point in this process, Step 3 can/will be revisited in an attempt to reach a satisfactory solution. In this embodiment, Step 3 is associated with an iterative process that continues to loop until it an exit condition (adequacy/termination) is determined to have been met by a user setting a condition in this software or process.

At Step 4, a GUI displays a user prompt to ask if a user has selected enough task/subtask elements to reach a conclusion about whether a satisfactory end state can be reached? In this embodiment, Step 4 GUI prompt is a yes or no question. An exemplary system will continue to Step 5 (no) or Step 6 (yes).

At Step 5, if the answer to Step 4 is No: No, I do not have enough tasks/subtasks/elements to reach a conclusion about whether a satisfactory end state can be reached, then the exemplary process returns to Step 3 to define additional tasks/subtasks/elements. A user will be prompted to continue defining tasks/subtasks in a loop until the Step 4 result is "yes—I have enough tasks to come to a conclusion (satisfactory end state): Then return to Step 3.

At Step 6, if the Answer to Step 4 is Yes: I have enough tasks/subtasks/elements to satisfy my end state, then the processing system outputs is a list of tasks/subtasks/elements then continues processing at Step 7.

Figure 2:
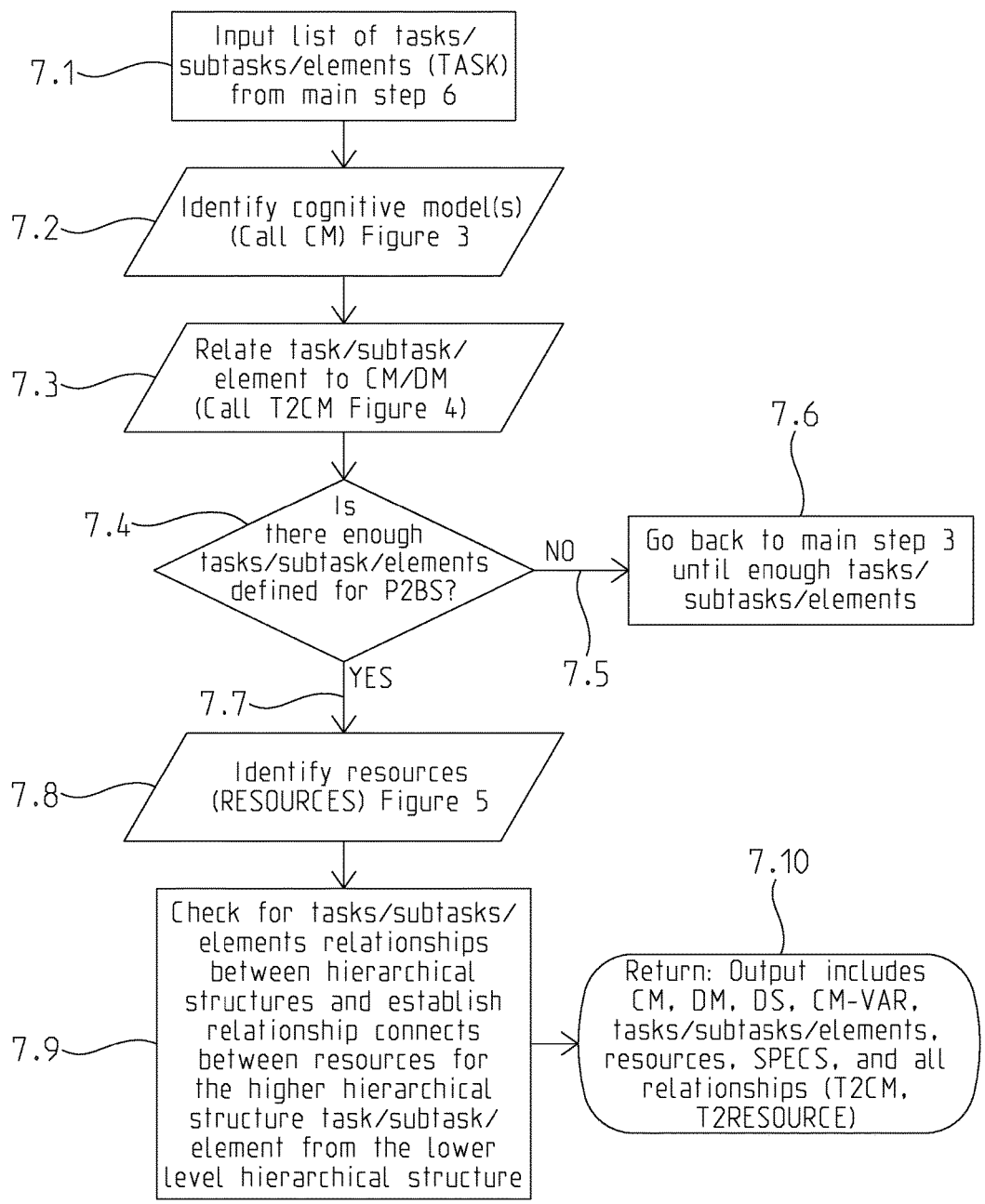
FIG. 2 shows an exemplary Resource/Cognitive/Task Population Mapping (RCT-PM) Module Flow Chart of an exemplary TMAP.

Referring to FIG. 2, at Step 7.1, Input list of Tasks/subtasks/elements (Task) from Main Step 6: Go to Step 7.2. At Step 7.2, Identify Cognitive Model (Call CM). Go to Step 7.2.1. (See FIG. 3)

Figure 3:
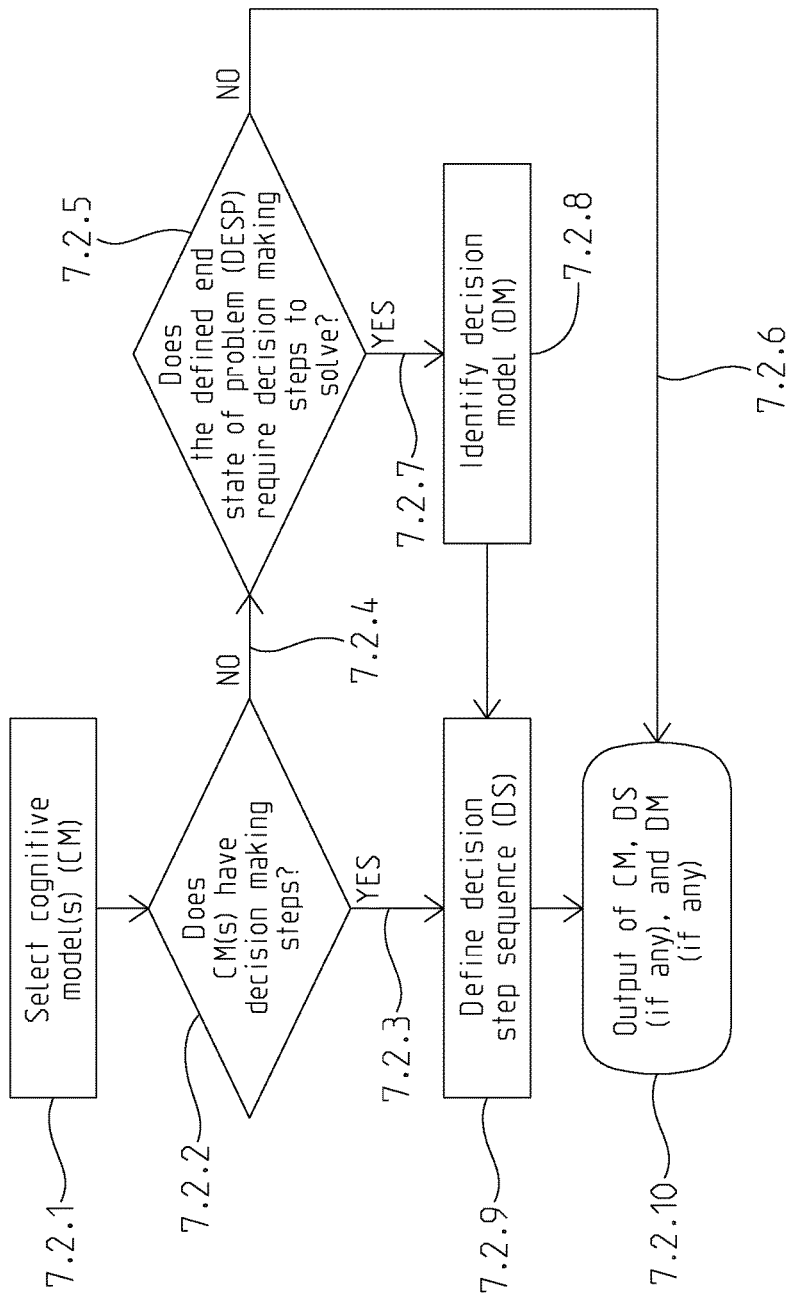
FIG. 3 shows an exemplary Cognitive Model (CM) Flow Chart of an exemplary TMAP.

Referring to FIG. 3, at Step 7.2.1, Select Cognitive Model(s) (CM). Go to Step 7.2.3. At Step 7.2.2, determine if CM Model(s) have decision-making steps? This is a yes or no question. Go to Step 7.2.3 or Step 7.2.4. At Step 7.2.3, determine if answer to Step 7.2.2 is Yes: Then go to Step 7.2.9. At Step 7.2.4, if answer to Step 7.2.2 is No: Then go to Step 7.2.5. At Step 7.2.5, determine if a defined end state of problem (DESP) requires decision making steps to solve? This is a yes or no question. Go to Step 7.2.6 OR 7.2.7. At Step 7.2.6, if answer to Step 7.2.5 is No: Then go to Step 7.2.10. At Step 7.2.7, if answer to Step 7.2.5 is Yes: Then go to Step 7.2.8. At Step 7.2.8, identify Decision Model (DM): Go to Step 7.2.9. At Step 7.2.9, define Decision Step Sequence (DS): Go to Step 7.2.10. At Step 7.2.10, output of CM if any and DS if any. Go to Step 7.3. (See FIG. 2)

Referring to FIG. 2, at 7.3, relate Task/subtask/element to Cognitive Model and/or Decision Model (Call T2CM FIG. 4) Go to Step 7.3.1.

In this embodiment, visual representation of a task/subtask elements and a Decision Model may be accomplished by drawing the "standard taxonomy" representations for the task/subtask/element and the components of the Decision Module and visually representing the interactions by drawing the "standard taxonomy" lines representing process flow, information flow or interaction. A visual representation can be quickly assessed for accuracy and completeness.

Figure 4A:
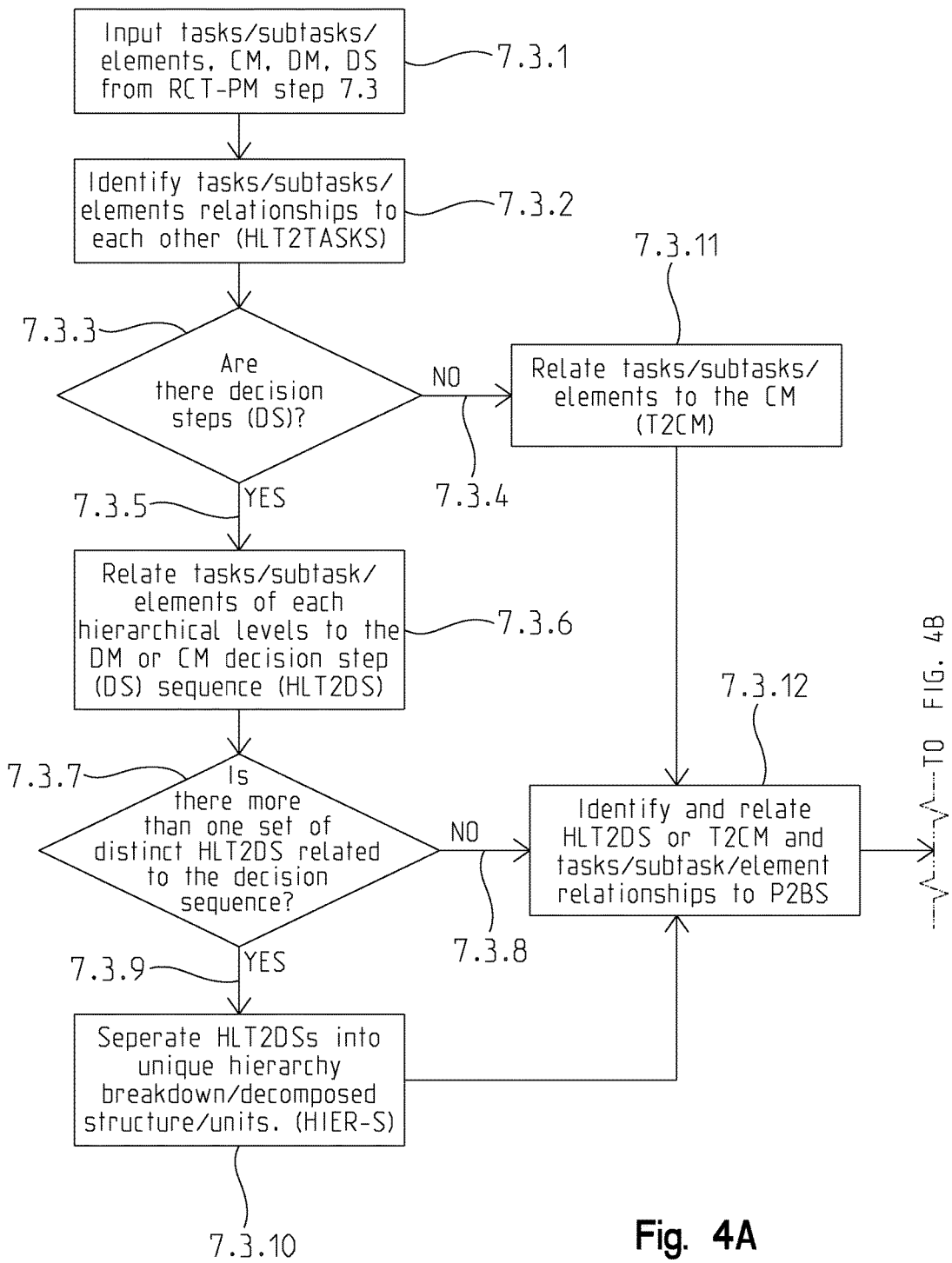
FIGS. 4a and 4b show an exemplary Tasks to TM (T2CM) Module Flow Chart of an exemplary TMAP.
Figure 4B:
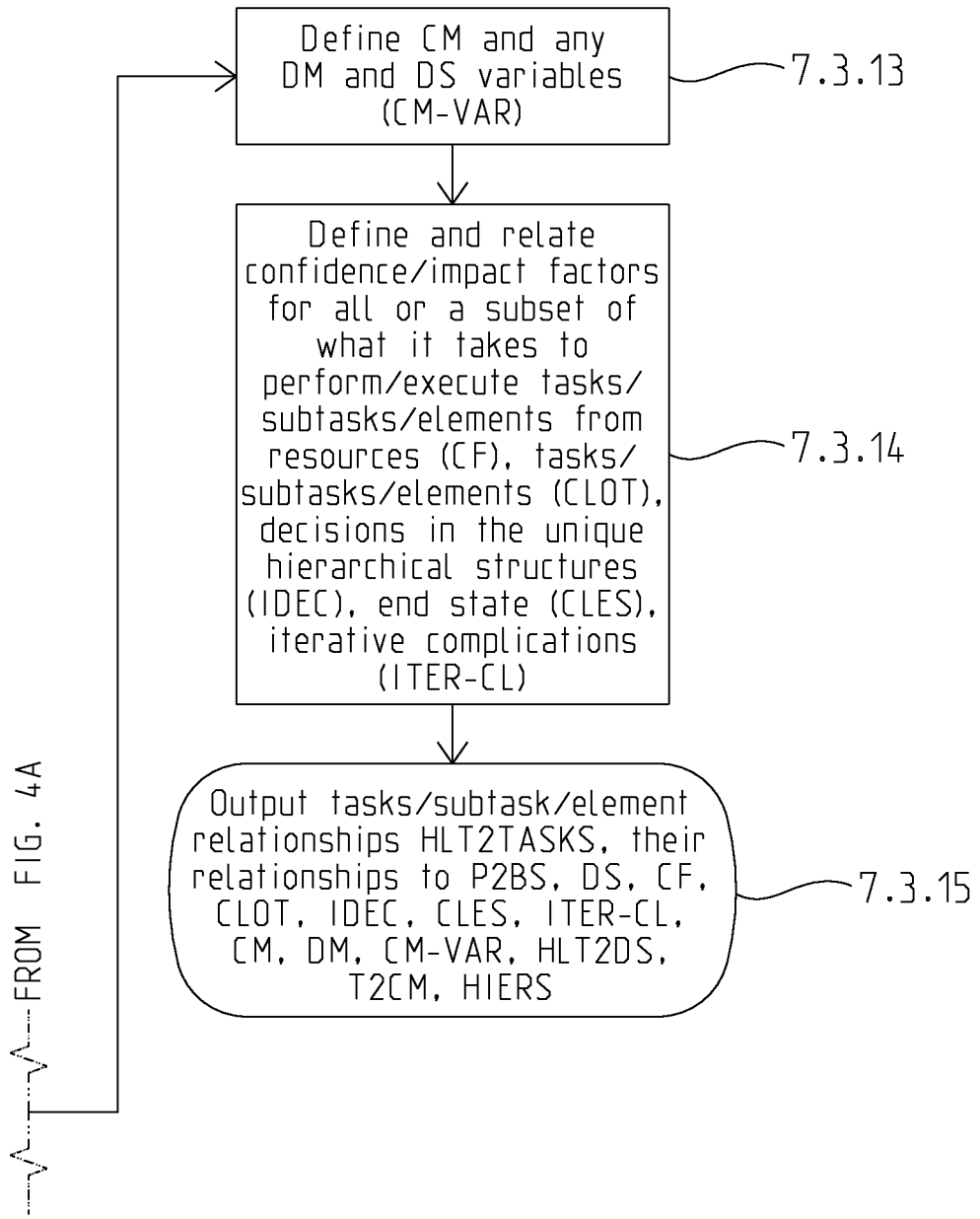

Referring to FIG. 4, At Step 7.3.1, input Tasks/subtasks/elements and Cognitive Model (CM) and/or Decision model DM and/or DS from RCT-PM Step 7.3: Go to Step 7.3.2. At Step 7.3.2, identify Tasks/subtasks/elements relationships to each other (HLT2TASKS): This is done by performing the following steps. Go to Step 7.3.3. At Step 7.3.3, determine if there are any decision steps (DS)?: This is a yes or no question. Go to Step 7.3.4 or Step 7.3.5. At Step 7.3.4, if the answer to Step 7.3.3 is No: Then go to Step 7.3.11. At Step 7.3.5, if the answer to Step 7.3.3 is Yes: Then go to Step 7.3.6. At Step 7.3.6, relate Tasks/Subtask/elements of each Hierarchical levels to the Cognitive Model CM or Decision Model (DM) decision step (DS) sequence (HLT2DS): Go to Step 7.3.7.

In this embodiment, a visual representation allows a traceable connection between the tasks and the decision steps. For decision based analysis, the INDEX can be utilized to show different relationship states of the decision to the tasks, providing a visual explanation.

At Step 7.3.7, determine if there is more than one set of distinct HLT2DS related the decision sequence?: This is a yes or no question. Go to Step 7.3.8 or Step 7.3.9. At Step 7.3.8, if the answer to Step 7.3.7 is No: Then go to Step 7.3.12. At Step 7.3.9, if the answer to Step 7.3.7 Yes: Then go to Step 7.3.10. At Step 7.3.10 separate HLT2DSs into unique hierarchy breakdown/decomposed structures. (HIER-S): This compartmentalizes the decisions into a logical order that is not visual overload, can be addressed separately, yet be recombined: Go to Step 7.3.11.

In this embodiment, a visual representation allows precise and accurate analytical "drill down" into the elements, properties, and relationships associated with the subtask/element in a manner that allows the results to be "rolled up" into an accurate and complete set of elements and relationships.

At Step 7.3.11, relate Tasks/Subtask/elements to the CM (T2CM): Go to Step 7.3.12. In this embodiment, a visual representation allows a traceable connection between the tasks and the cognitive model(s) and its' variables. At Step 7.3.12, identify and relate HLT22DS or T2CM and Tasks/subtask/element relationships to the problem to be solved (P2BS): Go to Step 7.3.13. In this embodiment, a visual representation allows a traceable connection between the tasks/subtasks/elements and the problem to be solved. At Step 7.3.13, define CM and any DM and DS variables (CM-VAR): Go to Step 7.3.14. At Step 7.3.14, define and relate confidence/impact factors for all or a subset of what it takes to perform/execute tasks/subtasks/elements from resources (CF), tasks/subtasks/elements (CLOT), decisions in the unique hierarchical structures (IDEC), End State (CLES), iterative compilations (ITER-CL): Go to Step 7.3.15. At Step 7.3.15 output Task/Subtask/element relationships HLT2TASKS, their relationships to P2BS, DS, CF, CLOT, IDEC CLES, ITER-CL, CM, DM, CM-VAR, HLT2DS, T2CM,HIER-S: Go to Step 7.4 (See FIG. 2).

Referring to FIG. 2, at Step 7.4 determine if there are enough tasks/subtask/elements defined for P2BS?: This is a yes or no question. Go to Step 7.5 or Step 7.6. At Step 7.5, if answer to Step 7.4 is No: No, then go to Step 7.6. At Step 7.6, go back to Main Step 3 (FIG. 1) until enough tasks/subtasks/elements are defined to reach the DESP for P2BS. At Step 7.7, if answer to Step 7.4 is Yes: Yes, then go to Step 7.8. At Step 7.8, identify resources: Create a list of any of the following: all available resources (for comparison to a current state), ideal resources (for creation of a comparisons model), and/or design resources (for design comparison). Resources can be an equipment, personnel, cost to solve the problem, etc. Costs can be associated at a lower hierarchical level and compiled to analyze costs to confidence levels for each task/subtask/element Go to Step 7.8.1 (See FIG. 5). In this embodiment, a visual representation of the existing resources may be accomplished by drawing the "standard taxonomy" representations for resources. A visual representation can be quickly assessed for accuracy and completeness.

Figure 5:
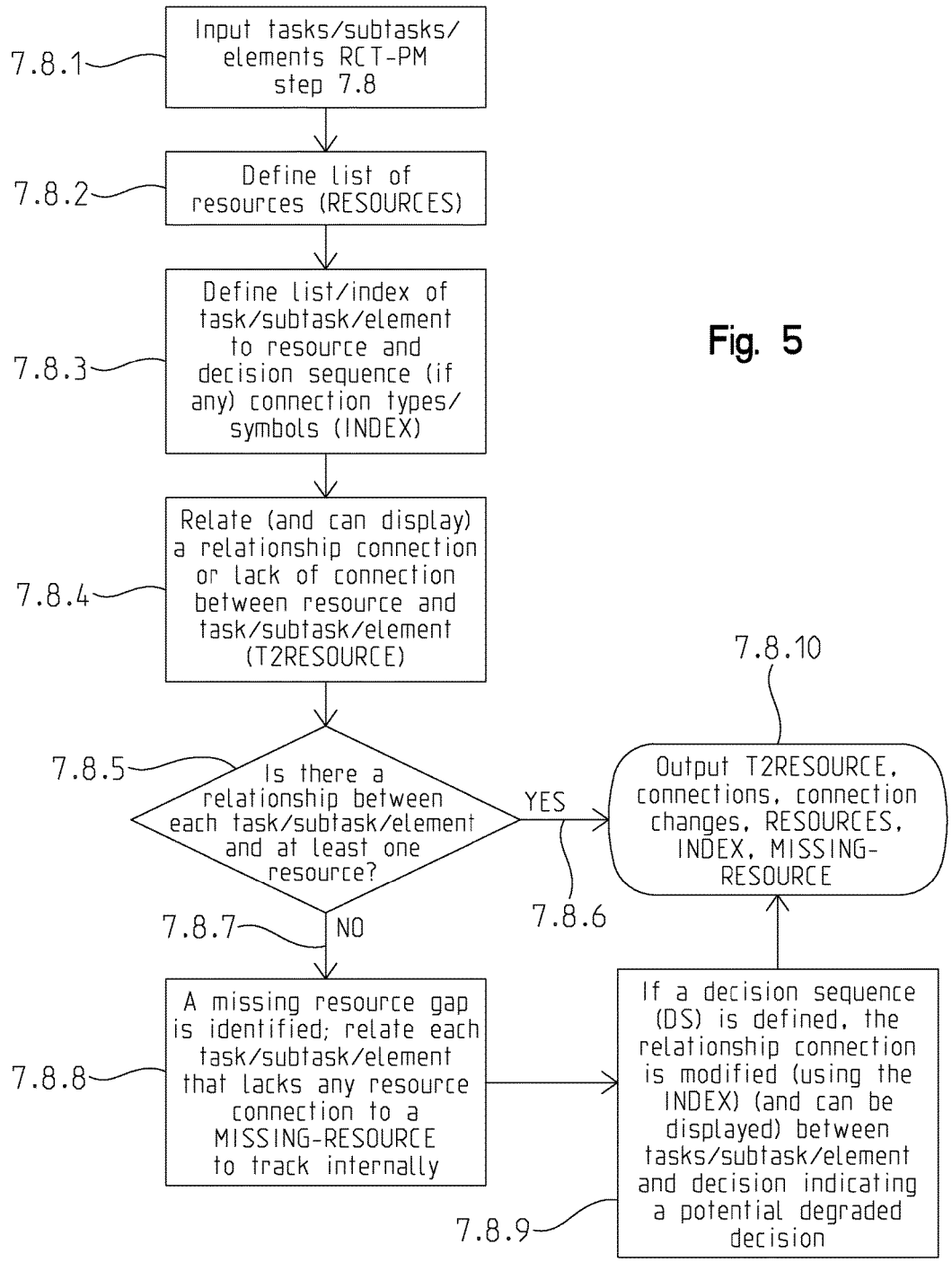
FIG. 5 shows an exemplary Task to Resource (T2RESOURCE) Module Flow Chart of an exemplary TMAP.

Referring to FIG. 5, at Step 7.8.1 input Tasks/subtasks/elements and Resources from RCT-PM Step 7.8: Go to Step 7.8.2. At Step 7.8.2, define list of resources (RESOURCES); Go to step 7.8.3. At Step 7.8.3, define list/index of task/subtask/element to resource and decision sequence (if any) connection types/symbols (INDEX). Go to Step 7.8.4. At Step 7.8.4, relate (and can display) a relationship connection or lack of connection between Resource and Task/subtask/element (T2RESOURCE) Go to Step 7.8.5. In this embodiment, a visual representation of these connections can be represented by using lines as defined in the agreed-upon "visual taxonomy." E.g., a solid line might represent relationship between task/subtask/element requirement that is met by a resource specification. A bold line might represent relationship between task/subtask/element requirement that is superseded by a resource specification, whereas a dotted line might represent relationship between task/subtask/element requirement that is only partially met (or degraded) by a resource specification. The lack of a line immediately identifies a missing resource. At Step 7.8.5, determine if there is a relationship between each task/subtask/element and at least one Resource?: This is a yes or no question, Go to Step 7.8.6 else go to Step 7.8.3. At Step 7.8.6, if answer to 7.8.5 is Yes: Go to Step 7.8.10. At Step 7.8.7, if answer to 7.8.5 is Yes: Go to Step 7.8.8. At Step 7.8.8, a missing resource gap is identified; relate each Task/subtask/element that lacks any resource connection to a MISSING-RESOURCE to track internally. Go to Step 7.8.9. In this embodiment, a visual representation of missing resources can be created through showing connections between tasks/subtasks/elements and a resource place hold. This allows for visual analysis and reminders that the task/subtask/element cannot be performed/executed. At Step 7.8.9, if a decision sequence (DS) is defined, then the relationship connection is modified (and can be displayed) between tasks/subtask/element and decision using the INDEX, indicating a potential degraded decision. This allows for early flags of degraded decisions. Go to Step 7.8.10. At Step 7.8.10, Output T2RESOURCE, connections, connection changes, RESOURCES, INDEX, MISSING-RESOURCE: Go to step 7.9 (See FIG. 2).

Referring to FIG. 2, At Step 7.9, check for tasks/subtasks/elements relationships between hierarchical structures and establish relationship connects between resources for the higher hierarchical structure task/subtask/element from the connected lower level hierarchical structure's task/subtask/element. In other words, if a task/subtask/element in hierarchical structure A has been decomposed further by another hierarchical structure B, the resources used in hierarchical structure B are also related to the connected task hierarchical structure A. At Step 7.10, return: Output includes CM, DM, DS, CM-VAR, Tasks/subtasks/elements, Resources, SPECS, and all relationships (T2CM, T2RESOURCE); go to Step 8 (See FIG. 1).

Referring to FIG. 1, At Step 8, call and execute processing associated with Call Assessment of Resource/Cognitive/Task Population Mapping Module (Call ASSESS-MAP): In this embodiment, the ASSESS-MAP is where the output of Main Step 7 (Call to RCT-PM module), is analyzed to determine if tasks requirements are met, not met, superseded, or degraded by resources; impact of the cognitive model on the resource specifications, adequate resources, relationships, cognitive and decision making model variables and parameters, gaps, etc. This exemplary output is a hierarchical structure, data structure that lists the Task(s) and potentially subtasks that are required to get a satisfactory solution to P2BS. The output of ASSESS-MAP flows to a decision in Main Step 9. Go to Step 8.1. (See FIG. 6) In this embodiment, a picture is worth a thousand words: the visual representation of the P2BS and the desired end state provides the state of the problem at a glance. It provides the analyst with a sandbox-like feel for the problem and allows the analyst to dynamically adjust relationships, elements, and properties to achieve a more desirable solution. It may also allow an immediate understanding of the resources and tasks to see opportunities for cost savings of research.

Figure 6:
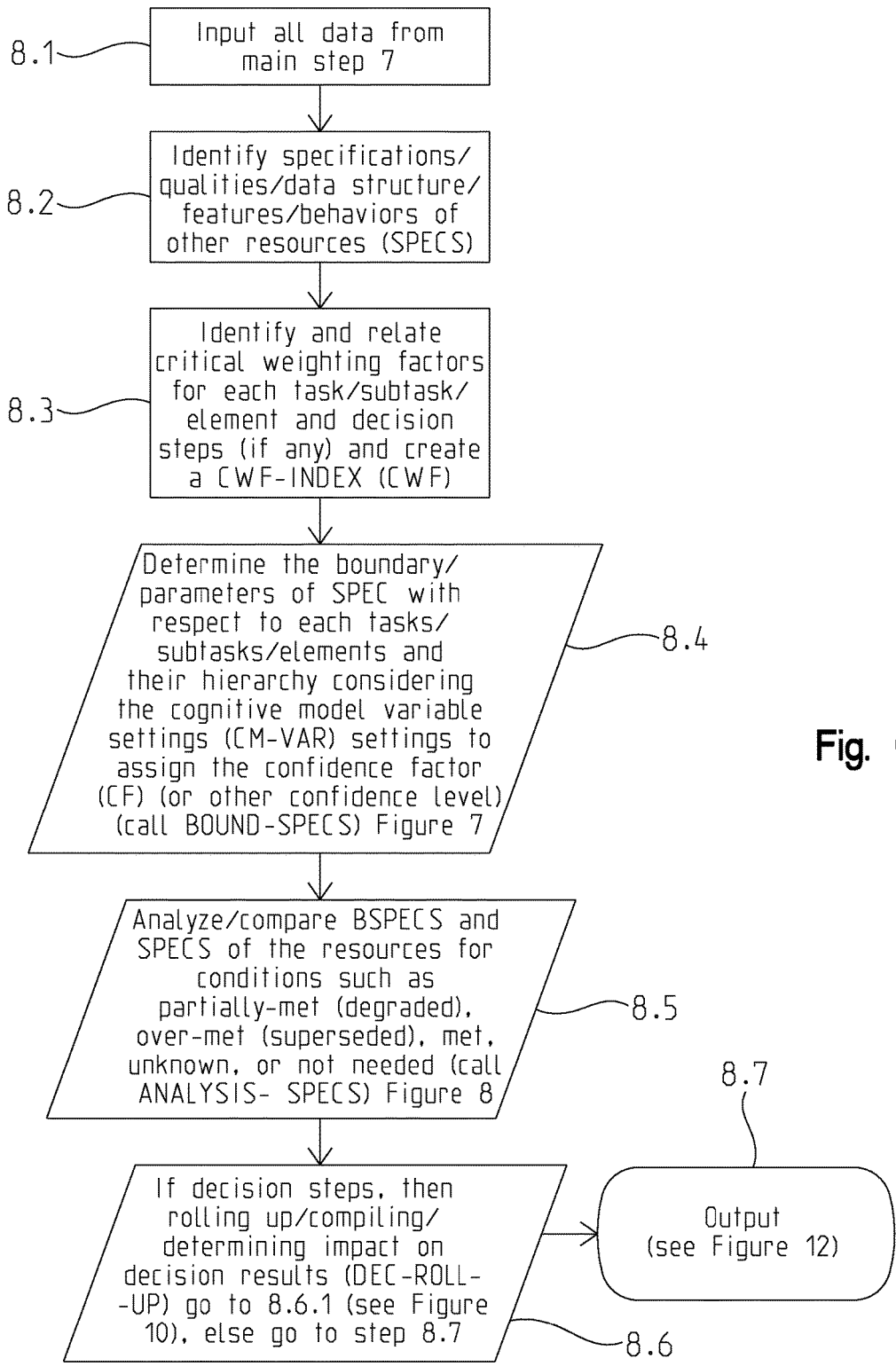
FIG. 6 shows an exemplary Assessment of an RCT-PM Output (ASSESS-MAP) Module Flow Chart of an exemplary TMAP.

Referring to FIG. 6, At Step 8.1 input all data from Main Step 7: Go to Step 8.2. At Step 8.2, identify Specification/qualities/data/structures/features/behaviors/other of Resources (SPECS): Here a user needs to identify the specification, limits, or capabilities of their existing resources. A user, if using this process to define a gap in an existing problem can use this step to define what the specifications or capabilities of a resource needs to be to solve a problem. Resources including can include an associated cost for each specification (SPEC) and boundaries/parameters of specifications to allow cost analysis to solve problem (Step 2 P2BS): Go to Step 8.3. At Step 8.3, identify and relate Critical Weighting Factors for each Task/Subtask/Element and decision steps (if any) (CWF): This step shows how much of an impact each task or element of a solution has when looking at the P2BS holistically. Go to step 8.4. In this embodiment, a visual representation of Critical Weighting Factors and tasks can be added shown on unique hierarchical structures as for visual reminders/justifications/analysis/depiction. At Step 8.4, determine the boundary/parameters of SPECS with respect to each Tasks/subtasks/elements and their hierarchy considering the Cognitive Model variable settings (CM-VAR) settings to assign the Confidence Factor (CF) FIG. 7: Keep in mind this is with respect to the P2BS. Go to Step 8.4.1. (See FIG. 7)

Figure 7:
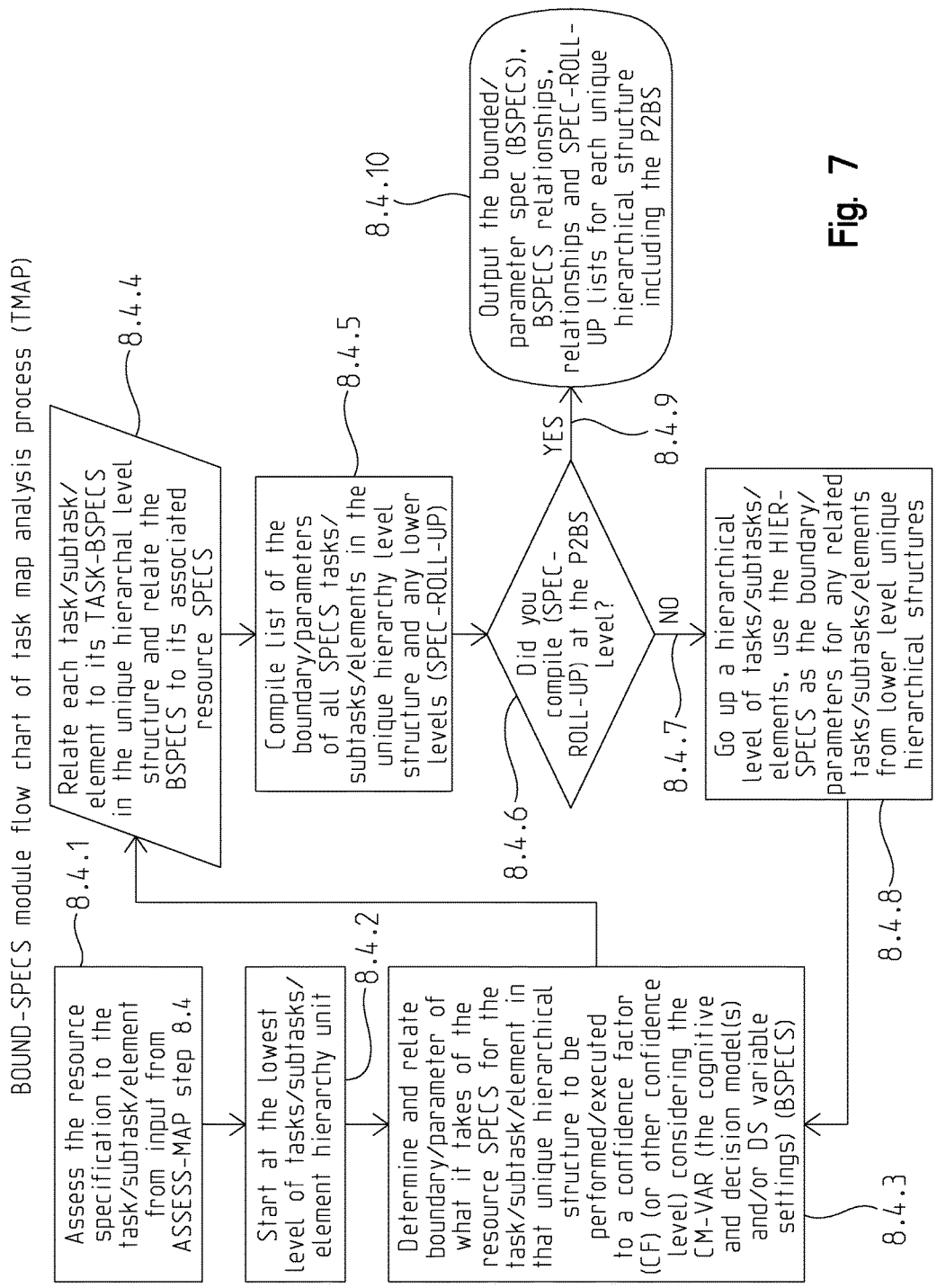
FIG. 7 shows an exemplary Boundary Specifications (BOUND-SPECS) Module Flow Chart of an exemplary TMAP.

Referring to FIG. 7, at Step 8.4.1, assess the resource specifications to the task/subtask/element from input from ASSESS-MAP Step 8.4: Determine which tasks/subtasks/elements no resources are currently available to complete the task/subtask/element and thus a gap is identified in the resources available to complete/perform/solve task/subtask/element to the confidence level. This analysis of the resources and their specifications allows for identification of unknown resources that are required to complete/solve/perform the task/subtask/element to the confidence level. Also determines which tasks/subtasks/elements can be completed/solved/performed to the confidence level by the available resources specifications. Go to Step 8.4.2. At Step 8.4.2, starting at a lowest level of Tasks/subtasks/elements hierarchy unit: Go to step 8.4.3. At Step 8.4.3, determine and relate boundary/parameter of what it takes of the resource SPECS for the task/subtask/element in that unique hierarchical structure to be performed/executed to a Confidence Factor (CF) (or other confidence level) considering the CM-VAR (the Cognitive and Decision Model(s) and/or DS variable settings) (BSPECS): Determine where resources are available but they cannot do everything that is needed to complete/solve/perform the task/subtask/element thus the task/subtask/element is degraded in completeness/performance/solution/ability to a desired confidence level. This analysis allows for partial completeness/performance/solution/ability of each tasks/subtask/element. A user and implementing system can determine a degree to which a defined task solution is degraded. (e.g., such as if a task requires a sensor to see in a full 360° of azimuth every second and the current sensor can only accomplish this every 1.2 seconds. This is a limit of the existing resource that may give me a confidence factor of between 0% and 99% toward solving the task at hand. If the sensor worked every second then the confidence could be 100%.) Go to Step 8.4.4. At Step 8.4.4, relate each Task/subtask/element to its TASK-BSPECS in the unique hierarchal level structure and relate the BSPECS to its associated resource SPECS: Go to step 8.4.5. At Step 8.4.5, compile a list of boundary/parameters of all SPECS Tasks/subtasks/elements in a unique hierarchy level structure and any lower levels (SPEC-ROLL-UP): Go to step 8.4.6. At Step 8.4.6, determine if a compile (SPEC-ROLL-UP) at the P2BS level was conducted? Go to Step 8.5.7 or 8.4.9. At Step 8.4.7, if 8.4.6 is No: Go to 8.4.8. At Step 8.4.8, processing will continue up a hierarchical level of Tasks/subtasks/elements, use the HIER-SPECS as the boundary/parameters for any related tasks/subtasks/elements from lower level unique hierarchical structures: Go to 8.4.3. At Step 8.4.9, if 8.4.6 is Yes: Go to 8.4.10. At Step 8.4.10, output the bounded/parameter specs (BSPECS), BSPECS relationships, Relationships, and SPEC-ROLL-UP lists for each unique hierarchical structure including the P2BS: Go to step 8.5. (See FIG. 6).

Figure 8:
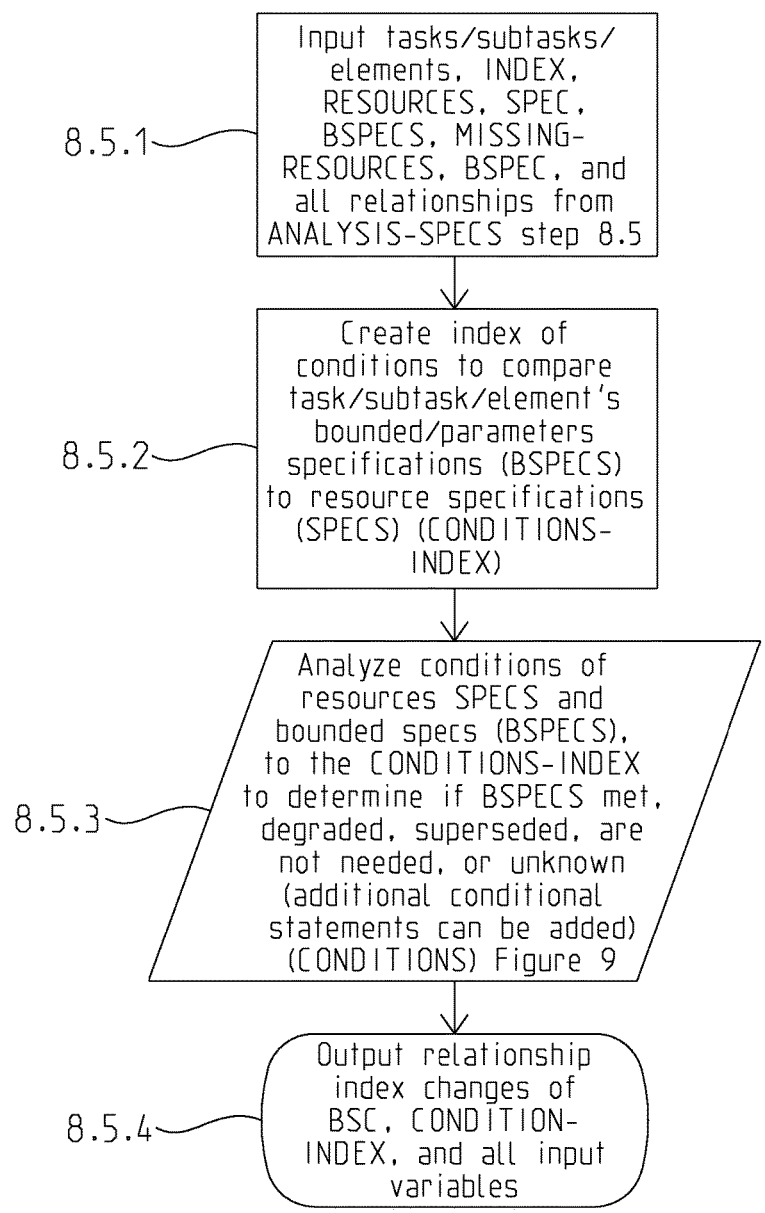
FIG. 8 shows an exemplary ANALYSIS-SPECS Module Flow Chart of an exemplary TMAP.

Referring to FIG. 6, At Step 8.5, analyze/compare BSPECS and SPECS of the resources for conditions such as partially-met (degraded), over-met (superseded), met, unknown, or not needed (Call ANALYSIS-SPECS) FIG. 8: This step analyzes how well a task/subtask/element, how well a hierarchical level of tasks/subtasks/elements, and the problem to be solved (P2BS from step 1) can be completed/solved/performed based on the resources, resource specifications, and confidence level. This step is used to quantify the confidence factor that exist with each existing resource with regards to the cognitive model being used and the problem that is to be solved. Each task or subtask needs to be linked to a resources that is available or the task/subtask needs to have resources identified as needed but not currently available to solve the task/subtask. A task/subtask can/will have multiple resources available and potentially can/will have multiple resources identified as needed but not currently available. Go to Step 8.5.1. (See FIG. 8)

Referring to FIG. 8, At Step 8.5.1, input Tasks/subtasks/elements, INDEX, RESOURCES, SPECS, BSPECS, MISSING—RESOURCE, BSPEC, and all relationships from ANALYSIS-SPECS Step 8.5: Go to step 8.5.2. At Step 8.5.2, create index of conditions to compare task/subtask/element's bounded/parameters specifications (BSPECS) to resource specifications (SPECS) (CONDITIONS-INDEX): Go to Step 8.5.3. At Step 8.5.3, analyze conditions of resources SPECS and bounded specs (BSPECS), to the CONDITIONS-INDEX to determine if BSPECS met, degraded, superseded, are not needed, or unknown (additional conditional statements can be added) (CONDITIONS) (See FIG. 9): Go to Step 8.5.3.1.

Figure 9:
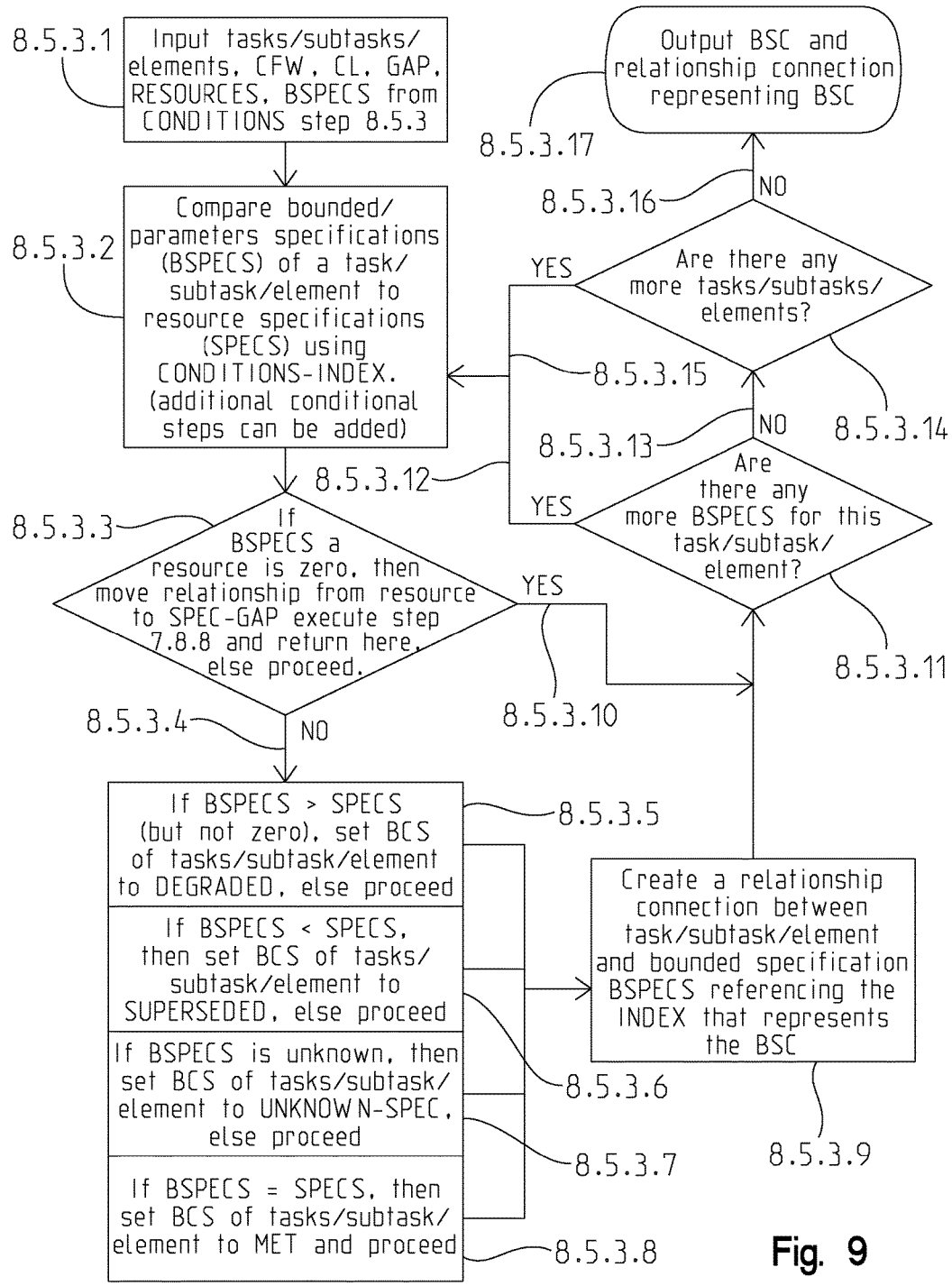
FIG. 9 shows an exemplary CONDITIONS Module Flow Chart of an exemplary TMAP.

Referring to FIG. 9, At Step 8.5.3.1, input Tasks/subtasks/elements, CFW, CL, GAP, RESOURCES, BSPECS from CONDITIONS Step 8.5.3: Go to step 8.5.3.2. At Step 8.5.3.2, compare bounded/parameters specifications (BSPECS) of a task/subtask/element to resource specifications (SPECS) using CONDITIONS-INDEX. (Additional conditional steps can be added): Go to step 8.5.3.3. At Step 8.5.3.3, if BSPECS a resource is zero, then move relationship from resource to SPEC-GAP execute step 7.8.8 and return here, else proceed: This is a yes no question with yes calling function 7.8.8 and then going to Step 8.5.3.10. A no response or determination will result in processing going to Step 8.5.3.4. At Step 8.5.3.4, if the answer to Step 8.5.3.3 is NO then go to Step 8.5.3.5. At Step 8.5.3.5, if BSPECS>SPECS (but not zero), set BCS of tasks/subtask/element to DEGRADED, else proceed: If TRUE go to 8.5.3.9 if FALSE go to Step 8.5.3.6. At Step 8.5.3.6, if BSPECS<SPECS, then set BCS of tasks/subtask/element to SUPERSEDED, else proceed: If TRUE go to Step 8.5.3.9 if FALSE go to Step 8.5.3.7. At Step 8.5.3.7, if BSPECS is unknown, then set BCS of tasks/subtask/element to UNKNOWN-SPEC else proceed: If TRUE go to Step 8.5.3.9 if FALSE go to Step 8.5.3.8. At Step 8.5.3.8, if BSPEC S=SPECS, then set BCS of tasks/subtask/element to MET, and proceed: Go to Step 8.5.3.9. At Step 8.5.3.9, create a relationship connection between task/subtask/element and Bounded Specification BSPECS referencing the INDEX that represents the BSC: Go to Step 8.5.3.11. Note: A visual representation of relationship connects of tasks/subtasks/elements to the resources in unique hierarchical structures for visual reminders/justifications/analysis/depiction of confidence level in the decision. At Step 8.5.3.10, if Yes from 8.5.3.3 and after returning from 7.8.8 then go to Step 8.5.3.11. At Step 8.5.3.11, determine if there any more BSPECS for this task/subtask/element?: This is a yes or no question. Go to Step 8.5.3.12 or Step 8.5.3.13. At Step 8.5.3.12, if yes then go to Step 8.5.3.2: Now loop through the process again. At Step 8.5.3.13, if no then go to Step 8.5.3.14. At Step 8.5.3.14, determine if there are any more tasks/subtasks/elements?: This is a yes or no question; if yes go to Step 8.5.3.15 if no go to Step 8.5.3.16. At Step 8.5.3.15, if yes go to 8.5.3.2: Now loop through the process again. At Step 8.5.3.16, if no go to Step 8.5.3.17. At Step 8.5.3.17 output BSC and relationship connection representing BSC and continue processing at Step 8.5.4. (See FIG. 8).

Referring to FIG. 8, At Step 8.5.4, output relationship index changes of BSC, CONDITION-INDEX, and all input variables: Go to Step 8.6. (See FIG. 7).

Referring to FIG. 7, At Step 8.6, if decision steps, then continue processing by rolling up/compiling/determining impact on decision results (DEC-ROLL-UP) go to 8.6.1 (See FIG. 10), else go to step 8.7. (See FIG. 6 and FIG. 12).

Figure 10:
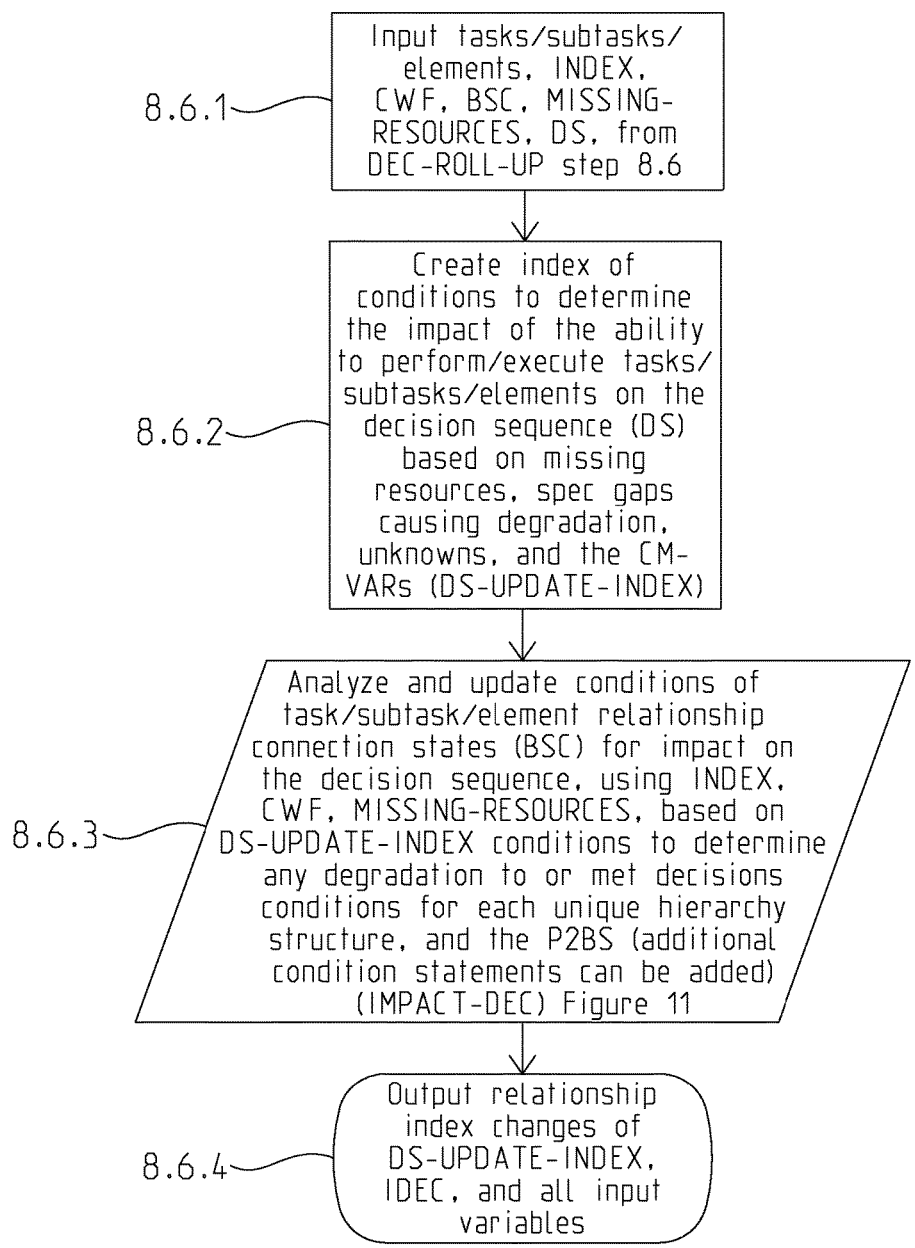
FIG. 10 shows an exemplary DEC-ROLL-UP Module Flow Chart of an exemplary TMAP.

Referring to FIG. 10, At Step 8.6.1, input Tasks/subtasks/elements, INDEX, CWF, BSC, MISSING-RESOURCE, DS, from DEC-ROLL-UP Step 8.6: Go to step 8.6.2. At Step 8.6.2, create index of conditions to determine the impact of the ability to perform/execute tasks/subtasks/elements on the decision sequence (DS) based on missing resources, spec gaps causing degradation, unknowns, and the CM-VARs (DS-UPDATE-INDEX): Go to step 8.6.3. At Step 8.6.3, analyze and update conditions of task/subtask/element relationship connection states (BSC) for impact on the decision sequence, using INDEX, CWF, MISSING-RESOURCES, based on DS-UPDATE-INDEX conditions to determine any degradation to or met decisions conditions for each unique hierarchy structure, and the P2BS (additional condition statements can be added) (IMPACT-DEC) FIG. 11: Go to step 8.6.3.1. (See FIG. 11).

Figure 11:
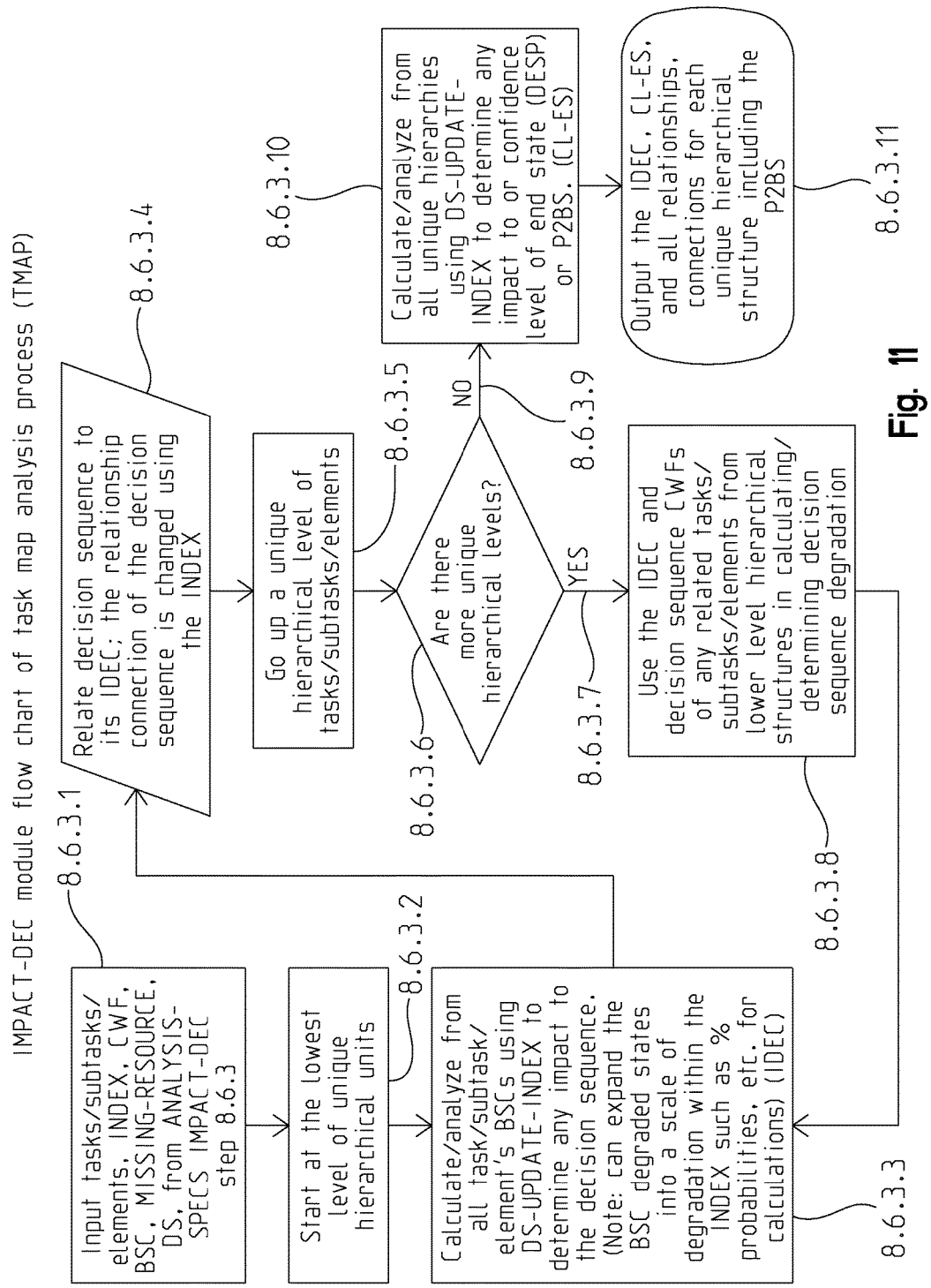
FIG. 11 shows an exemplary IMPACT-DEC Module Flow Chart of an exemplary TMAP.

Referring to FIG. 11, At Step 8.6.3.1, input Tasks/subtasks/elements, INDEX, CWF, BSC, MISSING-RESOURCE, DS, from ANALYSIS-SPECS IMPACT-DEC Step 8.6.3: Go to step 8.6.3.2. At Step 8.6.3.2, start at a lowest level of unique hierarchical units: Go to step 8.6.3.3. At Step 8.6.3.3, calculate/analyze from all task/subtask/element's BSCs using DS-UPDATE-INDEX to determine any impact to the decision sequence. (Note: can expand the BSC degraded states into a scale of degradation within the INDEX such as % probabilities, etc. for calculations) (IDEC): Go to step 8.6.3.4. At Step 8.6.3.4, relate decision sequence to its IDEC; the relationship connection of the decision sequence is changed using the INDEX: Go to step 8.6.3.5. In this embodiment, a visual representation of relationship connects of decisions in unique hierarchical structures for visual reminders/justifications/analysis/depiction of confidence level in the decision. At Step 8.6.3.5, go up a unique hierarchical level of Tasks/subtasks/elements: Go to Step 8.6.3.6. At Step 8.6.3.6, determine if there are more unique hierarchical levels?: This is a yes or no question, go to Step 8.6.3.7 for yes or step 8.6.3.9 for no. At Step 8.6.3.7, if yes go to Step 8.6.3.7. At Step 8.6.3.8, use IDEC and decision sequence CWFs of related tasks/subtasks/elements from lower level hierarchical structures in calculating/determining decision sequence degradation: Go to step 8.6.3.3 and loop through the process again. At Step 8.6.3.9, if no go to step 8.6.3.10. At Step 8.6.3.10, calculate/analyze from all unique hierarchies using DS-UPDATE-INDEX to determine any impact to or confidence level of end state (DESP) or P2BS. (CL-ES): Go to step 8.6.3.11. At Step 8.6.3.11, output the IDEC, CL-ES, and all relationships, Connections for each unique hierarchical structure including the P2BS: Go to step 8.6.4. (See FIG. 10) In this embodiment, a visual representation of relationship between the problem to be solved and the confidence level in the end state allows for top level visual summary of the problem and solution.

Referring to FIG. 10, At Step 8.6.4, output relationship index changes of DS-UPDATE-INDEX, IDEC, and all input variables: Go to step 8.7. (See FIG. 6 and FIG. 12).

Figure 12:
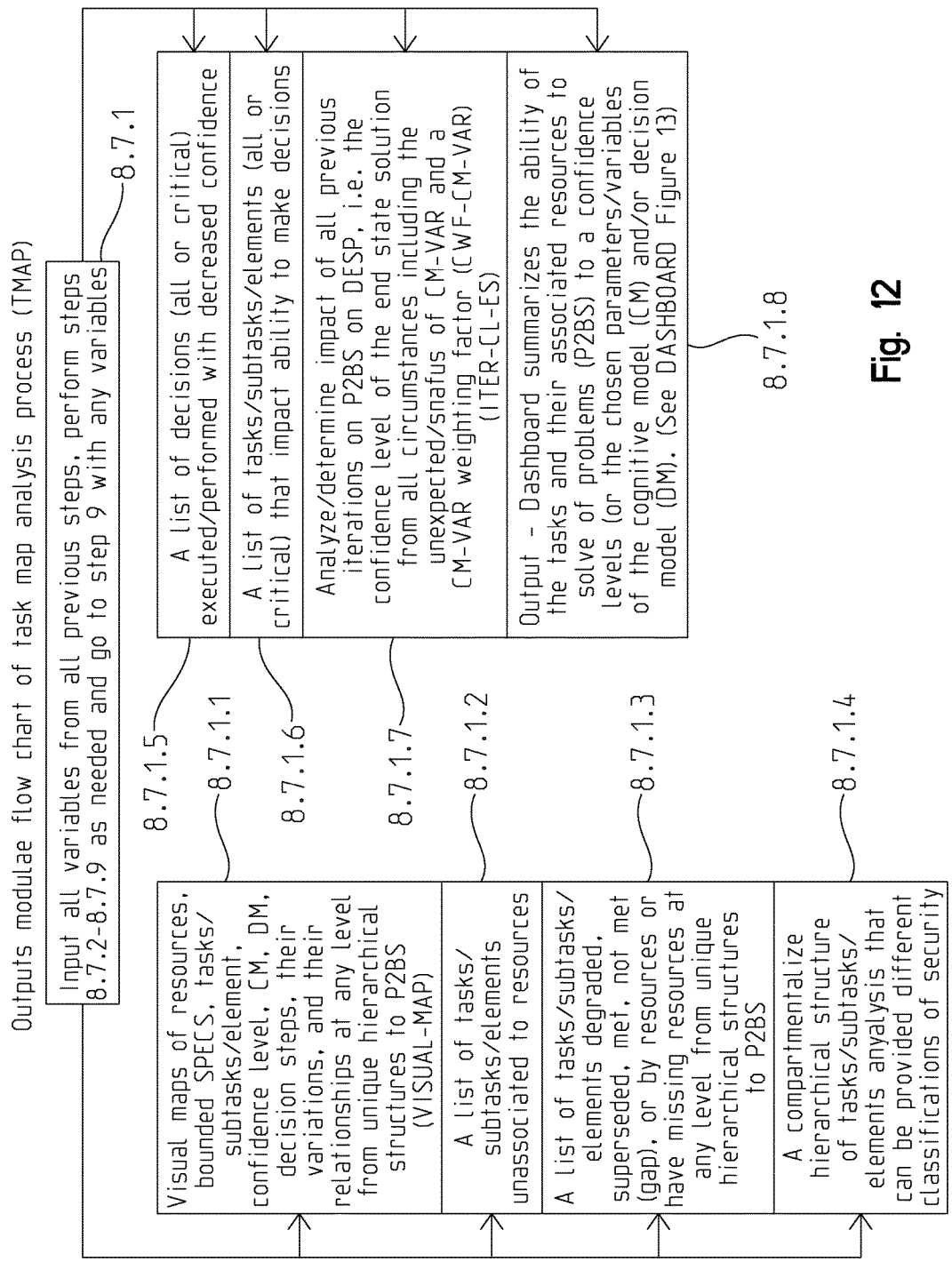
FIG. 12 shows an exemplary Outputs Module Flow Chart of an exemplary TMAP.

Referring to FIG. 6 and FIG. 12, At Step 8.7, output in view of Step 8.6.4; go to step 8.7.1. At Step 8.7.1, input all variables from all previous steps, perform steps 8.7.1 and 8.7.2 as needed and go to step 9 with any variables. At Step 8.7.1.1, generate Visual Maps of Resources, Bounded SPECS, Tasks/subtasks/element, Confidence Level, CM, DM, Decision Steps, their variations, and their relationships at any level from unique hierarchical structures to P2BS (VISUAL-MAP). This exemplary step allows for a layout of the variables and their relationships in a visual representation. The INDEX of relationship connections can be utilized to show connections between resources-tasks/subtasks/elements-decisions-cognitive/decision models at any hierarchical level and the problem to be solved. Each stakeholder can be provided a different view. In reverse, exemplary visual maps can be utilized to draw/document a deficiency from a user, for example, to draw lines of degradation of decisions and/or tasks and/or indicate missing resources. A visual map drawing can be iterated through the process to determine variables of degradation and impacts to the other hierarchical structures and the problem. At Step 8.7.1.2, a list of tasks/subtasks/elements unassociated to resources, i.e. a missing resource. The different critical weight factors can show priority of importance of the missing resources. At Step 8.7.1.3, a list of tasks/subtasks/elements (all or different critical weight factors) degraded, superseded, met, and/or not met (technology gap) by resources at any level from unique hierarchical structures to P2BS. Different critical weight factors can show priority of importance of fixing a technology gap; incremental upgrades of technology solutions can be re-iterated through a process of impacts. At Step 8.7.1.4, a compartmentalized hierarchical structure of tasks/subtasks/elements analysis that can be provided different classifications of security. At Step 8.7.1.5, a list of decisions (all or different Critical Weight Factors) executed/performed with decreased confidence. At Step 8.7.1.6, create a list of tasks/subtasks/elements (all or different critical weight factors) that impact ability to make decisions. At Step 8.7.1.7, analyze/determine impact of all previous iteration on P2BS on DESP, i.e. the confidence level of the end state solution from all circumstances including the unexpected/snafus of CM-VAR and a CM-VAR weighting factor (CWF-CM-VAR) (ITER-CL-ES). At Step 8.7.1.8, output—Dashboard—summarizes the ability of tasks and their associated resources to solve of Problem (P2BS) to a confidence levels (or the chosen parameters/variables of the Cognitive Model (CM) and/or Decision Model (DM). (see DASHBOARD FIG. 13)

Figure 13:
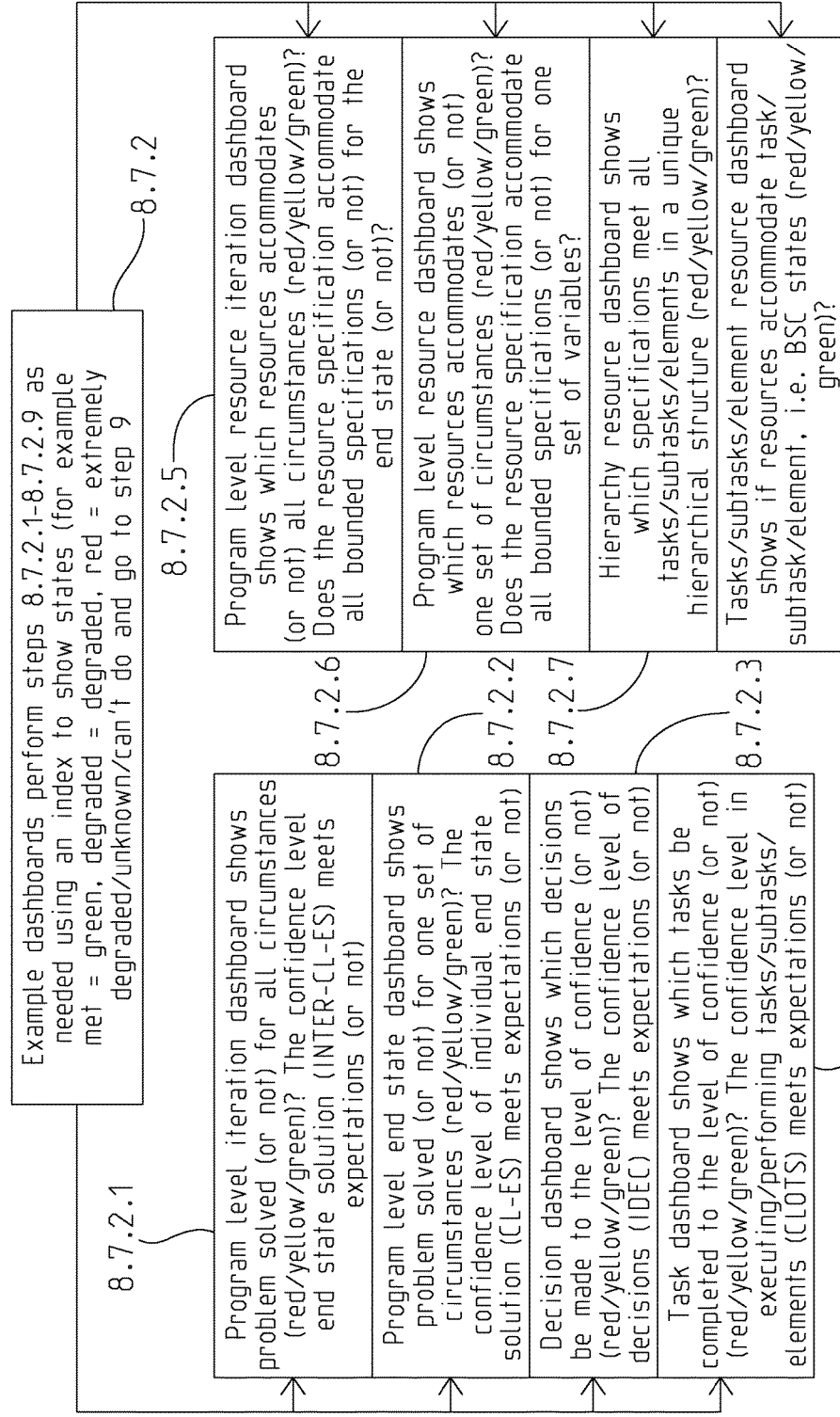
FIG. 13 shows an exemplary DASHBOARDS Module Flow Chart an exemplary TMAP.

Referring to FIG. 13, At Step 8.7.2, an exemplary Dashboard(s) generates/displays/performs steps 8.7.2.1-8.7.2.8 as needed using an index to show states (for example met=green, degraded=degraded, red=extremely degraded/unknown/can't do and go to Step 9 (See FIG. 1). At Step 8.7.2.1, an exemplary Program Level Iteration Dashboard shows Problem solved (or not) for all circumstances (red/yellow/green)? A confidence level end state solution (ITER-CL-ES) meets expectations (or not). At Step 8.7.2.2, Program Level End State Dashboard shows problem solved (or not) for one set of circumstances (red/yellow/green)? A confidence level of individual end state solution (CL-ES) meets expectations (or not). At Step 8.7.2.3, Decision Dashboard shows which decisions are made to the level of confidence (or not) (red/yellow/green)? The confidence level of decisions (IDEC) meets expectations (or not). At Step 8.7.2.4, Task Dashboard shows which tasks are completed to the level of confidence (or not) (red/yellow/green)? The confidence level in executing/performing tasks/subtasks/elements (CLOT) meets expectations (or not). At Step 8.7.2.5, Program Level Resource Iteration Dashboard shows which resources accommodates (or not) all circumstances (red/yellow/green)? Does the resource specification accommodate all bounded specifications (or not) for the end state (or not)? At Step 8.7.2.6, Program Level Resource Dashboard shows which resources accommodates (or not) one set of circumstances (red/yellow/green)? Does the resource specification accommodate all bounded specifications (or not) for one set of variables? At Step 8.7.2.7, Hierarchy Resource Dashboard shows which specifications meet all tasks/subtasks/elements in a unique hierarchical structure (red/yellow/green)? At Step 8.7.2.8, Tasks/subtasks/element Resource Dashboard shows if resources accommodate task/subtask/element, i.e. BSC states (red/yellow/green)?.

Referring back to FIG. 1, At Step 9, if ASSESS-MAP module results/output maps to end state of problem (DESP output) within the confidence level, then go to step 11 (yes), go to Step 10 to reiterate: This is where there is a determination made if a satisfactory solution has happened. I have a satisfactory output from ASSESS-MAP, Step 9 that meets my exit criteria from DESP, Main Step 2, of my problem/capability/effects from P2BS, Main Step 1. If the answer is yes then all of the information stored in the data sets of a) and the data sets of b) are returned as the solution for the P2BS. This is a yes or no question. Go to Step 10 (no) or Step 11 (yes). At Step 10, if the answer to Step 9 question is No: No, then go back to the start of the P2BS and loop through it again. More tasks may need to be defined or the definition of an acceptable solution to the P2BS may need changing: Go to Step 2. At Step 11, if the answer to Step 9 question is Yes: Yes, I have a satisfactory output from ASSESS-MAP, Step 9 that meets my exit criteria from DESP, Main Step 2, of my problem/capability/effects from P2BS, Main Step 1: Go to step 12. At Step 12, Exit: Return the acceptable solution to the P2BS. In this embodiment, recognize that an output of Step 12 can be a structured data set containing all of the returns for every task that was used in finding a satisfactory solution: Steps 8.7.1-8.7.2 are examples of outputs.

Figure 14:
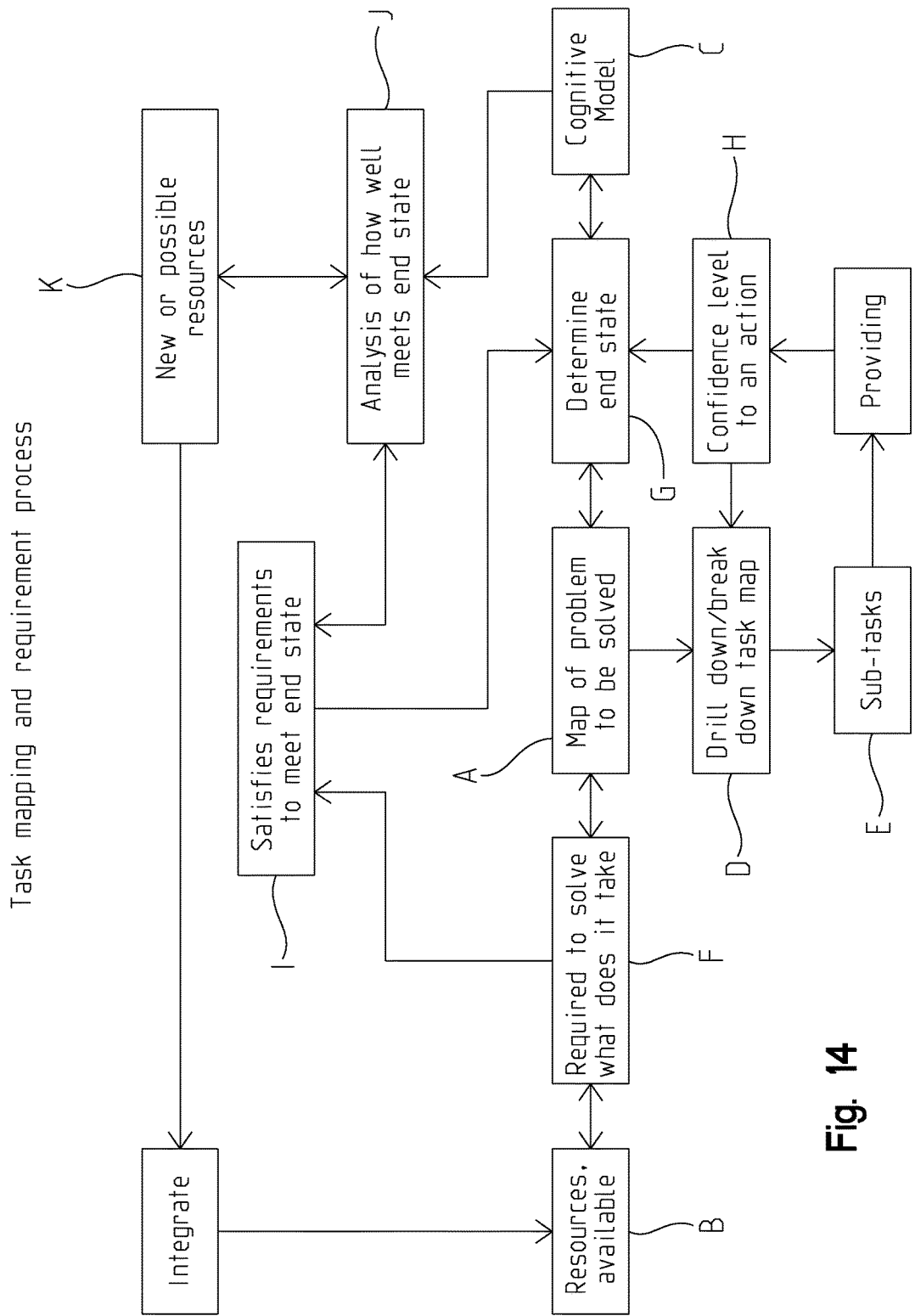
FIG. 14 shows a simplified embodiment of one version of an exemplary TMAP.

FIG. 14 shows a simplified embodiment of the invention. At Step A, create a map of a PB2S. At Step B, define available resources. At Step C, define a CM. At Step D, create a hierarchy of task objects with attributes. At Step E, define subtasks to objects created at Step D and define attributes for each subtask(s). At Step F, create relationships between resources defined at Step B and Tasks/Subtasks created at Steps D and E based on sufficiency of resources to perform Tasks or Subtasks in view of the PB2S. The Step F relationships can include different iconography or graphical depictions to describe attributes associated with the resources ability to perform a related task. A lack of a relationship indicates a lack of ability for a resource to be used to perform a Task or Subtask. At Step G, determine an end state associated with a PB2S and Task or Subtask. Relate the CM elements defined at Step C with Task and Subtasks in view of end state determined at Step G. At Step H, determine confidence level associated with resources and CM elements in view of Tasks and Subtasks and End State(s). At Step I, determine if requirements have been met associated with PB2S in view of resources, tasks/subtasks, and CM element mapping as well as confidence level and End State. At Step I, determine if new resources are needed to meet desired confidence level in solving P2BS at desired confidence level and desired End State.

Embodiments of the invention include one or more machine readable instruction storage mediums that store machine readable instructions such as executable or interpreted software instructions that are read and executed by a machine e.g. a computer system to perform various steps or process sequences described herein. For example, machine readable instructions are provided which generate graphical user interfaces on a display controlled by or part of the machine that reads the machine readable instructions.

Although the invention has been described in detail with reference to certain preferred embodiments, variations and modifications exist within the spirit and scope of the invention as described and defined in the following claims.

The invention claimed is:

1. A process for using a machine system to perform graphical problem, task, resource, and cognitive model depiction, graphical element attribute definition, selective relational mapping, modeling and validation comprising:
defining, using a graphical user interface (GUI) system comprising a processor, a display, a machine readable storage medium comprising a plurality of machine readable instructions that control the machine system to perform a plurality of operations or control functions including generating one or more GUIs and a user input system that receives user inputs to the machine system including one or more GUI inputs, one or more graphical problem representations in the one or more GUIs comprising one or more graphical problem objects stored as problem object data structures including problem object attributes data associated with at least one problem to be solved, wherein said GUI system generates the one or more graphical problem objects as a graphical problem object shape comprising a text data with user input textual description of the problem or problems to be solved and one of a plurality of color representations of the one or more graphical problem objects associated with one of a plurality of statuses of the problem or problems to be solved, wherein said one of a plurality of statuses comprises a first status of problem solved and a second status comprising problem not solved;

defining, using the GUI system, a plurality of graphical task or tasks representations comprising one or a plurality of graphical task objects in at least a first section of the display, said defining of said plurality of graphical task objects comprising associating each graphical task object with one or more hierarchical graphical task elements comprising task attributes data and optionally one or more graphical task sub-elements, wherein the plurality of task attributes data further comprises one or more boundary specifications data associated with respective said task attribute data that are associated with each graphical task object or said one or more graphical task sub-elements, wherein the boundary specifications data each comprise a single value data or a range of values data;

defining, using the GUI system, a plurality of graphical resource or resources representations comprising at least one or a plurality of graphical resource objects in at least a second section of the display and inputting then associating graphical resource object attributes data with said one or a plurality of graphical task object representations, wherein the resources attributes data comprises one or more resource specifications associated with each graphical resource object;

selecting, using the GUI system, at least one cognitive model graphical object defining a human cognitive process or model data comprising problem-solution attributes data elements where each problem-solution attributes data element comprises one or more decision making steps used to solve said problem to be solved based on accomplishing associated respective said plurality of graphical task objects and the human cognitive model steps comprise observe, orient, decide and act steps and respective model step attributes;

determining when, using one or more said machine readable instructions, at least one graphical relationship connection between one or more pairs of said one or more said graphical problem objects, said plurality of graphical task objects, said plurality of graphical resource objects, and at least one graphical cognitive model is missing or not present;

graphically, using the GUI system, associating another said at least one graphical relationship connection between at least one said one or more pairs of said one or more graphical task object, graphical resource object, and at least one element of said graphical cognitive model where at least one graphical relationship connection between said graphical resource, task or cognitive object is determined as missing or not present, wherein said graphically associating said at least one graphical relationship connection between said at least one graphical task object and at least one graphical resource object further comprises selectively correlating at least some of said task attributes comprising said boundary specifications with at least some of resource attributes comprising said specification data, and wherein said graphically associating another said at least one graphical relationship connection between at least one said graphical task object and at least one element of said graphical cognitive model comprises correlating at least one said task attribute with at least one said element of said graphical cognitive object;

defining one or more of a plurality of first attributes respectively associated with each said graphical relationship connection; and generating a graphical dashboard or data output associated with said graphical task objects, graphical resource objects, and said graphical cognitive model based in part on said graphical relationship connections, wherein said generating said graphical dashboard or data output comprises comparing one or more selected said first attributes with one or more predetermined data values or ranges of values to evaluate if one or more said selected first attributes match said data values or are within said range of values, wherein when selected said first attributes match said at least one said predetermined data values or said range of values then a selected graphical relationship connector associated with said selected said first attribute is displayed in a first color, else in a second color and wherein said first color is associated with a category of acceptability data stored on said recording medium associated with said relationships between said one or more graphical problem objects, said plurality of graphical task objects, said plurality of graphical resource objects, and at least one graphical cognitive model based on at least one said match of said at least one first attribute with at least one said predetermined value or said range of values.

2. A process as in claim 1, wherein said graphical dashboard has a first representation if one or more of said first attributes respectively associated with one of said graphical relationships connector match said at least one said predetermined data values or said range of values, else a second representation.

3. A process as in claim 2,
wherein said first representation is associated with a category of acceptability data stored on said recording medium associated with said relationships between said one or more problem objects, said plurality of graphical task objects, said plurality of resource objects, and at least one cognitive model based on at least one said match of said at least one first attribute with at least one said predetermined value or said range of values.

4. A non-transitory machine readable instruction storage medium adapted to store a plurality of non-transitory machine readable instructions, comprising
a first sequence adapted to be read by at least one processor to generate a first graphic user interface element on a display, said first graphical user interface element comprising one or more graphical representations of a problem to be solved based on user input of a problem data, needed capability data, or needed effect or user selection data from a menu displaying one or a plurality of graphical problem or problems representations data, graphical needed capability or capabilities representations data, or graphical needed effect or effects representations data stored in a first database;
a second sequence adapted to be read by said at least one processor to generate a second graphical user interface element on said display comprising a prompt displaying a plurality of graphical solutions or end states representations data to be associated with said first graphical user interface element;
a third sequence adapted to be read by said at least one processor to generate a third graphical user interface element on said display comprising one or more graphical resources elements associated with said plurality of graphical solutions or end states representations that are associated with said first graphical user interface element, said graphical solutions and end states representations data further comprising at least one constraint data associated with said graphical representations of said problem to be solved, graphical needed capability or needed effects representation data, wherein the graphical resources elements comprising resources attributes data comprises one or more resource specifications associated with each graphical resource element;
a fourth sequence adapted to be read by said at least one processor to generate a fourth graphical user interface element on said display comprising a plurality of graphical tasks, subtasks, or elements associated with one or more of said graphical solutions or end states representations as well as said one or more graphical resources representations and associating each graphical task object with one or more hierarchical graphical task elements comprising task attributes data and optionally one or more graphical task sub-elements, wherein the plurality of task attributes data further comprises one or more boundary specifications data associated with respective said task attribute data that are associated with each graphical task object or said one or more graphical task sub-elements, wherein the boundary specifications data each comprise a single value data or a range of values data;
a fifth sequence adapted to be read by said at least one processor to generate a fifth graphical user interface element on said display comprising a graphical cognitive model associated with determining acceptability or non-acceptability of one or more of said resources as well as said tasks, subtasks, or elements, wherein said graphical cognitive model comprises cognitive model steps comprising observe, orient, decide and act steps and respective model step attributes;
a sixth sequence adapted to be read by said at least one processor to generate a sixth graphical user interface element on said display comprising a plurality of steps operable for determining acceptability or non-acceptability of attributes of said tasks, subtasks, and elements including determining if inputs and outputs of said tasks, subtasks, and elements meet predetermined or user defined parameters associated with at least one or more said solutions or end states; and
a seventh sequence adapted to be read by said at least one processor to generate a color representation associated with one or more of said graphical user interface elements based on one or more predetermined criteria, wherein said predetermined criteria comprise a comparison between a plurality of acceptability criteria associated with one or more said graphical user elements.

5. A non-transitory machine readable instruction storage medium as in claim 4, further comprising an output sequence adapted to be read by said at least one processor to read a database operable for storing results of one or more said plurality of processing sequences.

6. A non-transitory machine readable instruction storage medium adapted to be read by at least one processor to store a plurality of non-transitory machine readable instructions adapted for generation of graphical resource modeling and validation comprising:
a first processing sequence operable for operating said at least one processor to generate a first set of graphical user interface (GUI) elements that displays a first plurality of user input fields and receives a first plurality of inputs from a user data input device defining one or more problem description graphical representations comprising one or more problem object description or problem attributes data including conditions or environment associated with a user defined problem to be solved, wherein said first set of GUI elements comprises one or more graphical problem objects as a graphical problem object shape comprising a text data with user input textual description of the problem or problems to be solved and a plurality of color representations of said problem description graphical representations associated with a plurality of statuses of the problem or problems to be solved comprising a first and second problem status color representations, wherein a default said color representation of said problem description graphical representation is defaulted to said second problem status color representation graphically indicating a problem does not have needed cognitive model, tasks and resources correlations to one or more predetermined solution sufficiency levels or value including binary determinations, condition based determinations, or user judgement based problem solution sufficiency determinations, wherein said binary determinations include solved or not solved as well as sufficient or not sufficient;

a second processing sequence operable for generating a second set of GUI elements that displays a second plurality of user input fields and receives a second plurality of inputs from said user data input device defining one or a plurality of tasks comprising one or a plurality of task objects, said defining of said one or a plurality of task objects comprising associating each task object with one or more hierarchical task elements comprising task attributes data and optionally one or more task sub-elements, wherein the plurality of task attributes data further comprises one or more boundary specifications data associated with respective said task attribute data that are associated with each task object or said one or more task sub-elements, wherein the boundary specifications data each comprise a single value data or a range of values data;

a third processing sequence operable for generating a third set of GUI elements that displays a third plurality of user input fields and receives a third plurality of inputs from said user data input device defining a plurality of resources comprising one or a plurality of resource objects comprising resource attribute data, wherein the resources attributes data comprises one or more resource specifications associated with each resource object;

a fourth processing sequence operable for generating a fourth set of GUI elements that displays a fourth plurality of user input fields and receives a fourth plurality of inputs from said user data input device selecting at least one cognitive model defining a human cognitive process or model steps comprising one or more observer perception of one or more pattern steps, one or more decision response determination steps responding to the one or more patterns, and execution of the one or more decision steps and wherein said cognitive model steps comprise observe, orient, decide and act steps and respective model step attributes;

a fifth processing sequence operable for enabling said user to define or insert one or more of a fifth set of GUI elements comprising one or more graphical relationship links between one or more pairs of said cognitive model step, said one or plurality of task objects, and said one or plurality of resource objects, wherein said first status is determined to exist when each said cognitive model steps, said one or plurality of task objects, and said one or plurality of resource objects are associated with each other using said one or more graphical links;

a sixth processing sequence operable for generating a graphical dashboard or data output associated with said task objects, resource objects, and said cognitive model based in part on said graphical links including said plurality of color representations of at least one said problem description graphical representations, wherein said generating said graphical dashboard or data output comprises includes comparing one or more of selected said attributes of said cognitive model steps, resource objects, or task objects with one or more predetermined data values or ranges of values to evaluate if one or more said selected attributes match said data values or are within said range of values, wherein when selected said attributes match said at least one said predetermined data values or said range of values then a selected graphical relationship and one of said plurality of status associated with said selected said attributes is displayed in a first color, else in a second color and wherein said first color denotes one of said plurality of statues indicating acceptability of said relationships between said one or more problem objects, said plurality of task objects, said plurality of resource objects, and at least one cognitive model based on at least one said match of said at least one said attribute with at least one said predetermined value or said range of values.

7. A non-transitory machine readable instruction storage medium as in claim 6, wherein said graphical dashboard has a first representation if a pair of said attributes associating any two said objects match said at least one said predetermined data values or said range of values, else a second representation.

8. A non-transitory machine readable instruction storage medium as in claim 7, wherein said first representation denotes one of said plurality of statuses indicating acceptability of said relationships between said one or more problem objects, said plurality of task objects, said plurality of resource objects, and at least one cognitive model based on at least one said match of said at least one attribute with at least one said predetermined value or said range of values.

9. A machine implemented method of graphical problem, task, resource, and cognitive model depiction, graphical element attribute definition, relational mapping as well as validation using a graphical user interface comprising:
  operating said graphical user interface to define at least one problem to be solved and related problem attributes including at least one objective and problem environment or context or alternatively select said at least one problem to be solved from a plurality of known problems, capacities, or effects, said selection of said problem including selecting at least one said problem to be solved from a plurality of said problems displayed on a drop down menu on said graphical user interface;
  inputting a plurality of tasks, subtasks, or task elements and respective task attributes including task effects proposed for use in relation to the at least one problem to be solved in said graphical user interface and selecting and associating task parameters and attributes with said tasks, subtasks, or elements in said graphical user interface associated with said at least one problem to be solved, wherein said task attributes comprise task effect or effects performance of the task produces and one or more limitations on a capability of said task, wherein the plurality of task attributes data further comprises one or more boundary specifications data associated with respective said task attribute data that are associated with each task elements or said one or more task sub-elements, wherein the boundary specifications data each comprise a single value data or a range of values data;

selecting at least one cognitive model steps defining a decision step sequence or decision model steps proposed for use in relation to the at least one problem to be solved as well as defining associated cognitive model step attributes and wherein said cognitive model steps comprise observe, orient, decide and act steps and respective model step attributes;

determining if at least one first relationship type exists between each of said plurality of tasks, subtasks, or task elements and each of said cognitive model steps exists based on task and cognitive model step attribute correlation;

defining a list of resources and respective resource attributes proposed for use in relation to the at least one problem to be solved and determining if at least one second relationship type exists between each of said resources and each of said plurality of tasks, subtasks, or task elements based on task and resource attribute correlation, wherein said resource attributes comprise effect or effects each resource can produce and one or more limitations on a capability of each resource and wherein the resources attributes comprises one or more resource specifications associated with each resource;

graphically associating said at least one first relationship types with said plurality of tasks, subtasks or task elements with said resources and at least one cognitive model step where said first relationship type is determined; and generating a graphical, hierarchical dashboard or data output showing one or more said tasks, subtasks, or task elements associating at least one said resources by one or more first relationship types as well as showing said one or more said tasks, subtasks, or task elements associating at least one said cognitive model steps, showing the resources, tasks, subtasks, or task elements, and the cognitive model steps solve said problem is solved with displayed resources, tasks, subtasks, or task elements, and cognitive model steps, wherein said generating said graphical, hierarchical dashboard or data output comprises comparing one or more selected said first attributes with one or more predetermined data values or ranges of values to evaluate if one or more said selected first attributes match said data values or are within said range of values, wherein when selected said first attributes match said at least one said predetermined data values or said range of values then a selected first relationship type associated with said selected said first attribute is displayed in a first color, else in a second color and wherein said first color is associated with a category of acceptability data stored on said recording medium associated with said relationships between said one or more problem, said plurality of task objects, said plurality of resource objects, and at least one cognitive model based on at least one said match of said at least one first attribute with at least one said predetermined value or said range of values.

* * * * *